United States Patent
Tanabe et al.

(10) Patent No.: US 8,867,002 B2
(45) Date of Patent: Oct. 21, 2014

(54) POLYMER COMPOSITION HAVING PHOTOALIGNABLE GROUP, LIQUID CRYSTAL ALIGNMENT FILM FORMED OF THE POLYMER COMPOSITION, AND LIQUID CRYSTAL DISPLAY DEVICE HAVING PHASE DIFFERENCE PLATE FORMED OF THE LIQUID CRYSTAL ALIGNMENT FILM

(71) Applicants: JNC Corporation, Tokyo (JP); JNC Petrochemical Corporation, Tokyo (JP)

(72) Inventors: Mayumi Tanabe, Chiba (JP); Daisuke Ootsuki, Chiba (JP); Kie Kubouchi, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/753,956

(22) Filed: Jan. 30, 2013

(65) Prior Publication Data
US 2013/0203920 A1 Aug. 8, 2013

(30) Foreign Application Priority Data
Feb. 3, 2012 (JP) ................................. 2012-022389

(51) Int. Cl.
G02F 1/1337 (2006.01)
C08F 30/08 (2006.01)
C08L 83/10 (2006.01)
C08L 33/16 (2006.01)
C08L 33/14 (2006.01)
C08L 83/06 (2006.01)

(52) U.S. Cl.
CPC .................. *C08L 83/06* (2013.01); *C08L 83/10* (2013.01); *C08L 33/16* (2013.01); *C08L 33/14* (2013.01); *G02F 1/1337* (2013.01); *C08F 30/08* (2013.01)
USPC ........... 349/123; 428/1.2; 428/1.23; 526/279; 526/319; 526/320; 526/321; 526/326; 526/328; 526/328.5

(58) Field of Classification Search
None
See application file for complete search history.

(56) References Cited

U.S. PATENT DOCUMENTS

| | | | |
|---|---|---|---|
| 6,056,894 A | 5/2000 | Hirschmann et al. | |
| 8,399,068 B2 * | 3/2013 | Akiike et al. | 427/508 |
| 2008/0035886 A1 | 2/2008 | Yanai | |

FOREIGN PATENT DOCUMENTS

| | | | |
|---|---|---|---|
| JP | 10-245560 | | 9/1998 |
| JP | 2008-38109 | | 2/2008 |
| JP | 2008-098394 | | 4/2008 |
| WO | WO 2009/025388 | * | 2/2009 |

* cited by examiner

*Primary Examiner* — Marc Zimmer
(74) *Attorney, Agent, or Firm* — Wenderoth, Lind & Ponack, L.L.P.

(57) ABSTRACT

To provide a photoalignable material that can yield a photoalignable film having a high optical uniformity and no alignment defect, and allows photoalignment with exposure in a short period of time. A photoalignable polymer composition containing a specific photoalignable polymer having a silicone group or a fluorine-substituted alkyl group, and a photoalignable group, and a specific non-photoalignable polymer is manufactured, and the photoalignable film is manufactured by applying the polymer composition onto a base material or the like, drying an applied surface thereon, and irradiating the applied surface with light.

9 Claims, No Drawings

POLYMER COMPOSITION HAVING PHOTOALIGNABLE GROUP, LIQUID CRYSTAL ALIGNMENT FILM FORMED OF THE POLYMER COMPOSITION, AND LIQUID CRYSTAL DISPLAY DEVICE HAVING PHASE DIFFERENCE PLATE FORMED OF THE LIQUID CRYSTAL ALIGNMENT FILM

TECHNICAL FIELD

The present invention relates to a photoalignable polymer composition, a liquid crystal alignment film formed of the polymer composition, an optical film having the liquid crystal alignment film, and an optical device such as a liquid crystal display device having the optical film. More specifically, the invention relates to a photoalignable polymer composition having a low refractive index, and an excellent transparency, liquid crystal alignment ability, solvent resistance and heat resistance, and an application using the same to an optical use. The photoalignable polymer composition of the invention is suitable particularly for a patterned phase difference plate used for a passive glasses 3D display, a built-in phase difference plate in a liquid crystal display, a color filter overcoat having an optical alignment function, or the like.

BACKGROUND ART

A liquid crystal display device is used in various kinds of liquid crystal display devices, including a monitor of a notebook-sized personal computer or a desktop personal computer, a viewfinder of a video camera, a projection display and a television. The liquid crystal display device is further utilized as an optoelectronics-related device such as an optical printer head, an optical Fourier transformation device and a light valve. As a liquid crystal display device that has been applied so far, a display device using a nematic liquid crystal is predominantly applied, and a practical application has been made for a liquid crystal display device having a twisted nematic (TN) mode in which a direction of alignment of liquid crystals in the vicinity of one substrate, and a direction of alignment of liquid crystals in the vicinity of the other substrate are twisted at an angle of 90 degrees, a super twisted nematic (STN) mode in which the directions of alignment are ordinarily twisted at an angle of 180 degrees or more, and a so-called thin-film-transistor (TFT) mode in which a thin-film transistor is used.

However, a viewing angle at which an image can be properly visually recognized is narrow in the liquid crystal display devices, and when the image is viewed from an oblique direction, luminance and contrast may be occasionally decreased, and luminance inversion may be occasionally caused in a halftone. The issue of the viewing angle has been recently improved by a liquid crystal display device having a TN mode in which an optical compensation film is used, a multi-domain vertical alignment (MVA) mode in which a technology of homeotropic alignment and a technology of protrusion structure are simultaneously applied (see Patent literature No. 1), an in-plane switching (IPS) mode according to a transverse electric mode (see Patent literature No. 2), or the like.

A development of technology on the liquid crystal display device has been achieved not only by an improvement of a driving mode and a device structure as described above but also by an improvement of a component used for the display device. Among the components used for the display device, in particular, a liquid crystal alignment film is one of important elements relating to a display quality of the liquid crystal display device, and a role of the liquid crystal alignment film becomes increasingly important with achieving a high quality of the display device year by year.

The liquid crystal alignment film is required to uniformly control alignment of molecules of liquid crystals for developing uniform display characteristics in the liquid crystal display device. Therefore, the liquid crystal alignment film is required to uniformly align liquid crystal molecules on a substrate in one direction to further develop a fixed tilt angle (pretilt angle) from a substrate surface.

Moreover, in order to realize an improvement in contrast and extension of a viewing angle range in an image display device, as an optical compensation film or a phase difference film, for example, a stretched film having refractive index anisotropy or a film prepared by aligning and polymerizing a polymerizable liquid crystal compound is used.

In general, the liquid crystal alignment film is prepared using a liquid crystal aligning agent. The liquid crystal aligning agent that is mainly used is currently a solution prepared by dissolving polyamic acid or soluble polyimide into an organic solvent. Such a solution is applied to the substrate, and then a film is formed by a means such as heating, and thus a polyimide liquid crystal alignment film is formed. Various kinds of liquid crystal aligning agents other than polyamic acid are also examined, however, are seldom practically utilized in view of heat resistance, chemical resistance (resistance to liquid crystals), applicability, liquid crystal alignment properties, electric characteristics, optical characteristics, display characteristics and so forth.

Industrially, a rubbing method that is simple and allows a high speed treatment in a large area is widely applied as an alignment treatment method. The rubbing method applies a treatment for rubbing a surface of the liquid crystal alignment film in one direction by using a fabric prepared by transplanting fibers of nylon, rayon, polyester or the like, and a uniform alignment of the liquid crystal molecules can be obtained by the treatment. However, dust or static electricity is generated or the like by the rubbing method. Thus, an alignment defect or an influence of dust or static electricity on the liquid crystal device is regarded as a problem. Moreover, in the case of a patterned phase difference film, control of an alignment pattern by the rubbing treatment is difficult.

Consequently, a development has recently been made for a liquid crystal alignment control method in place of the rubbing treatment. With regard to a photoalignment method by which an alignment treatment is applied by irradiation with light, many alignment mechanisms have been proposed, such as a photolysis method, a photoisomerization method, a photodimerization method and a photocrosslinking method (see Patent literature No. 3, Patent literature No. 4, Patent literature No. 5 and Patent literature No. 6). Non-contact alignment is achieved in the photoalignment method, which is different from the rubbing method. In principle, a smaller amount of dust and static electricity is generated by the photoalignment method, as compared with the rubbing treatment.

An improvement in performance as the liquid crystal display device can be expected by controlling a state of alignment of molecules in a liquid crystal monomolecular layer in contact with the liquid crystal alignment film by using a liquid crystal alignment film having good alignment properties to which the alignment treatment is applied by the photoalignment method.

A passive glasses 3D display has been recently practically applied as one of 3D display modes. According to the 3D display, a phase difference plate is mounted on a panel of the liquid crystal display. As the phase difference plate, an examination has been made for a patterned phase difference plate prepared by aligning the polymerizable liquid crystal compound to the liquid crystal alignment film to which the alignment treatment is applied by the photoalignment method. Patterning of the phase difference plate is performed by irradiating a film with polarized ultraviolet light having a different polarization direction to prepare the liquid crystal alignment film, and then applying polymerizable liquid crystals to the film to allow patterning alignment. Upon preparing the patterned phase difference plate, time of exposure to polarized ultraviolet light can influence productivity in a process, but the productivity tends to be further increased as the time of exposure thereto is shorter. Accordingly, reduction of the time of exposure to polarized ultraviolet light has been required.

Moreover, a plastic such as triacetyl cellulose (TAC) and a cyclic olefinic polymer may be occasionally used for the substrate for the phase difference plate. Such a plastic including TAC has a lower heat resistance, as compared with glass. Therefore, when polyimide is obtained by applying a solution containing polyamic acid and a high boiling point solvent onto the substrate of the plastic and heating the substrate at a high temperature, use of the resultant polyimide as the liquid crystal alignment film has been difficult in some cases. Furthermore, TAC has a low solvent resistance. Therefore, a solvent that can be used is limited according to the method by which the film is prepared by applying an aligning agent to be the liquid crystal alignment film onto the substrate. For example, polyamic acid that has been used for forming polyimide so far has a low solubility in the solvent that can be applied to TAC, which has been a problem.

CITATION LIST

Patent Literature

Patent literature No. 1: JP 2947350 B.
Patent literature No. 2: JP 2940354 B.
Patent literature No. 3: WO 2011/115079 A.
Patent literature No. 4: JP 2005-275364 A.
Patent literature No. 5: JP 4011652 B.
Patent literature No. 6: JP H12-212310 A.

SUMMARY OF INVENTION

Technical Problem

An object of the invention is to provide a photoalignable polymer composition that can align liquid crystal molecules even when exposure time is short, and can be dissolved into a solvent applicable to various substrates, and to provide a photoalignment film, typically, a liquid crystal alignment film that is prepared using the polymer composition, and is excellent in solvent resistance and transparency, and has a high photoalignment ability to polymerizable liquid crystals.

Solution to Problem

The present inventors have diligently conducted research and development, as a result, have found that the problem described above can be solved by a photoalignable polymer composition containing a specific polymer having a photoalignable group and a specific non-photoalignable polymer. More specifically, the invention is as described below.

The photoalignable polymer composition of the invention is characterized by containing as a first component a polymer having a silicone group or a fluorine-substituted alkyl group, and a photoalignable group, and as a second component a non-photoalignable polymer obtained by polymerizing a monomer containing at least one kind selected from the group of methacrylic acid and methacrylate.

The photoalignable group in the first component includes a functional group having a structure in which anisotropy is caused by a reaction such as photolysis, photoisomerization, photodimerization and photocrosslinking by irradiating the photoalignable group with light, preferably, a structure in which photodimerization or photoisomerization is caused, in particular.

The invention also concerns a liquid crystal alignment film, formed of the photoalignable polymer composition.

The invention further concerns an optical device, having a phase difference plate obtained using the photoalignable polymer composition.

The invention still further concerns a patterned phase difference plate, formed of the photoalignable polymer composition.

Item 1. A photoalignable polymer composition, containing as a first component a polymer having a silicone group or a fluorine-substituted alkyl group, and a photoalignable group, and as a second component a non-photoalignable polymer obtained by polymerizing a monomer containing at least one kind selected from the group of methacrylic acid and methacrylate.

Item 2. The photoalignable polymer composition according to item 1, wherein the photoalignable group in the first component includes a functional group having a structure that is photodimerized or photoisomerized.

Item 3. The photoalignable polymer composition according to item 1 or 2, wherein the photoalignable group in the first component has at least one kind of structures represented by general formulas (I-1) to (I-3) as described below.

Formula 1

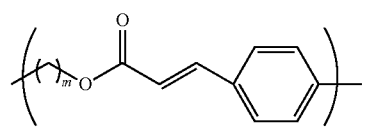

(I-1)

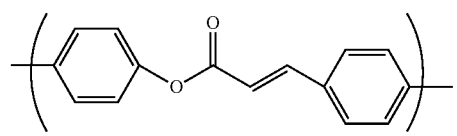

(I-2)

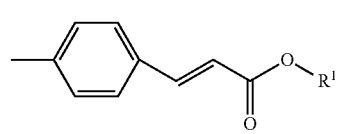

(I-3)

wherein $R^1$ represents hydrogen or an alkyl group having 1 to 5 carbons in which arbitrary hydrogen may be replaced by fluorine, m represents an integer from 0 to 6, and arbitrary hydrogen of a phenylene group may be replaced by fluorine, a methyl group or a methoxy group.

Item 4. The photoalignable polymer composition according to any one of items 1 to 3, wherein the polymer of the first component has a silicone group and the silicone group is represented by general formula (I-4) as described below.

Formula 2

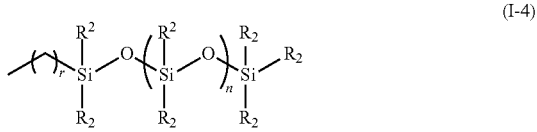
(I-4)

wherein $R^2$ represents hydrogen or an alkyl group having 1 to 5 carbons in which arbitrary hydrogen may be replaced by fluorine, r represents an integer from 0 to 6 and n represents an integer from 1 to 200.

Item 5. The photoalignable polymer composition according to any one of items 1 to 3, wherein the polymer of the first component has a fluorine-substituted alkyl group and the fluorine-substituted alkyl group is represented by general formula (I-5) as described below.

Formula 3

(I-5)

wherein $R^3$ represents an alkyl group having 1 to 20 carbons in which one or more of arbitrary hydrogen is replaced by fluorine.

Item 6. The photoalignable polymer composition according to any one of items 1 to 5, wherein the non-photoalignable polymer of the second component is obtained by polymerizing a monomer containing at least one kind selected from the group of methacrylic acid, alkyl methacrylate, hydroxyalkyl methacrylate including a hydroxyalkyl group having 2 to 5 carbons, methacrylate including a carboxyl group and methacrylate including a phenolic hydroxyl group.

Item 7. The photoalignable polymer composition according to any one of items 1 to 4, wherein the polymer of the first component includes a constitutional unit represented by either of formulas (I-1-1) and (I-4-1), or formulas (I-1-1) and (I-4-1') as described below.

Formula 4

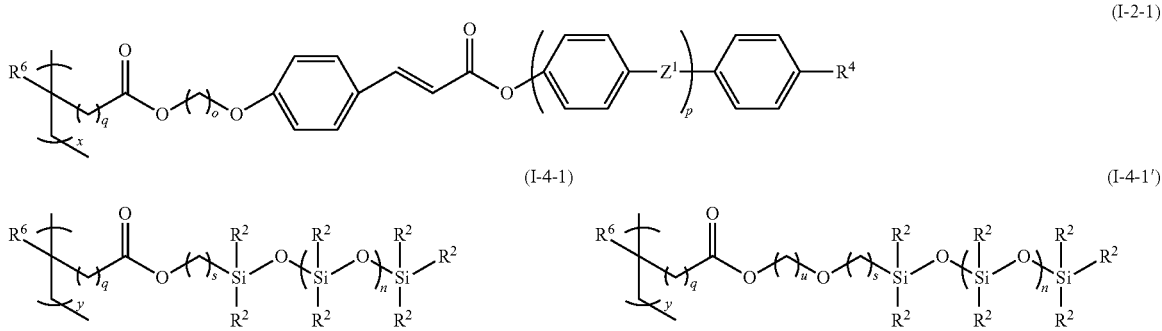

wherein $R^2$ represents hydrogen or an alkyl group having 1 to 5 carbons in which arbitrary hydrogen may be replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: x+y≤1, and arbitrary hydrogen of a phenylene group may be replaced by fluorine, a methyl group or a methoxy group.

Formula 5

(II)

wherein $R^7$ represents hydrogen or a methyl group, and t represents 0 or 1.

Item 8. The photoalignable polymer composition according to any one of items 1 to 4, wherein the polymer of the first component includes a constitutional unit represented by formulas (I-1-1') and (I-4-1) as described below.

Formula 6

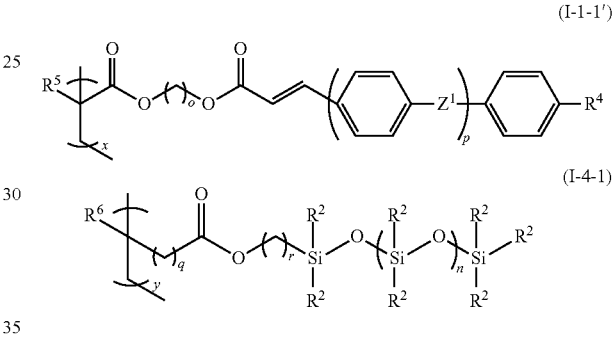

wherein $R^2$ represents hydrogen or an alkyl group having 1 to 5 carbons in which arbitrary hydrogen may be replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^5$ represents hydrogen or a methyl group, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: x+y≤1, and arbitrary hydrogen of a phenylene group may be replaced by fluorine, a methyl group or a methoxy group.

Formula 7

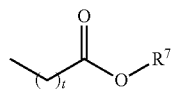
(II)

wherein $R^7$ represents hydrogen or a methyl group, and t represents 0 or 1.

Item 9. The photoalignable polymer composition according to any one of items 1 to 4, wherein the polymer of the first component includes a constitutional unit represented by formula (I-2-1) and formula (I-4-1) as described below.

Formula 8

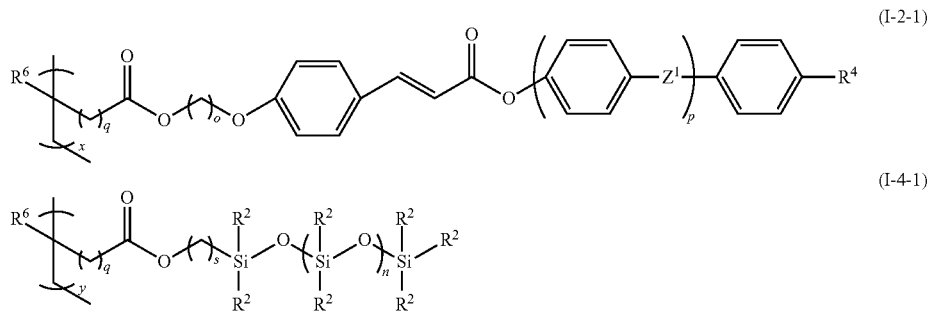

wherein $R^2$ represents hydrogen or an alkyl group having 1 to 5 carbons in which arbitrary hydrogen may be replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^6$ represents hydrogen, a methyl group or a group represented by formula (II) as described below, $Z^1$ represents a single bond, —COO— or —OCO—, represents an integer from 0 to 6, n represents an integer from 1 to 200, o represents an integer from 2 to 6, p represents an integer from 0 to 2, q represents 0 or 1, x and y are a molar fraction, and satisfy a relationship: x+y≤1, and arbitrary hydrogen of a phenylene group may be replaced by fluorine, a methyl group or a methoxy group.

Formula 9

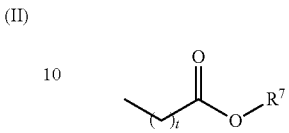
(II)

wherein $R^7$ represents hydrogen or a methyl group, and t represents 0 or 1.

Item 10. The photoalignable polymer composition according to any one of items 1 to 4, wherein the polymer of the first component includes a constitutional unit represented by formula (I-2-1') and formula (I-4-1) as described below according to item 8.

Formula 10

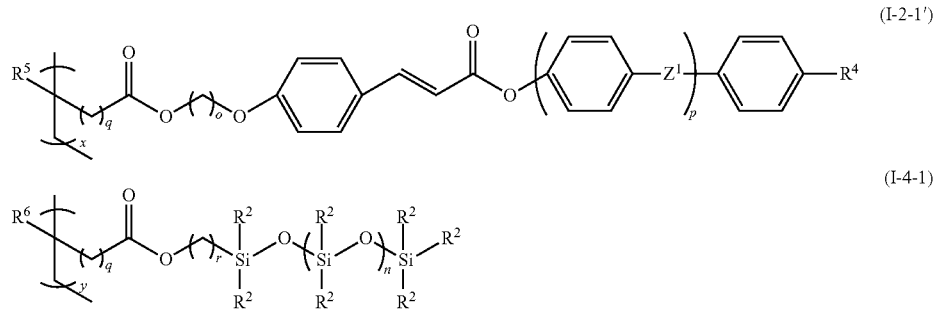

wherein $R^2$ represents hydrogen or an alkyl group having 1 to 5 carbons in which arbitrary hydrogen may be replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^5$ represents hydrogen or a methyl group, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: $x+y \leq 1$, and arbitrary hydrogen of a phenylene group may be replaced by fluorine, a methyl group or a methoxy group.

Formula 11

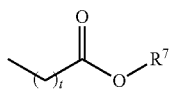
(II)

wherein $R^7$ represents hydrogen or a methyl group, and t represents 0 or 1.

Item 11. The photoalignable polymer composition according to any one of items 1 to 4, wherein the polymer of the first component includes a constitutional unit represented by either of formula (I-3-1) and formula (I-4-1), or formula (I-3-1) and formula (I-4-1') as described below.

Formula 12

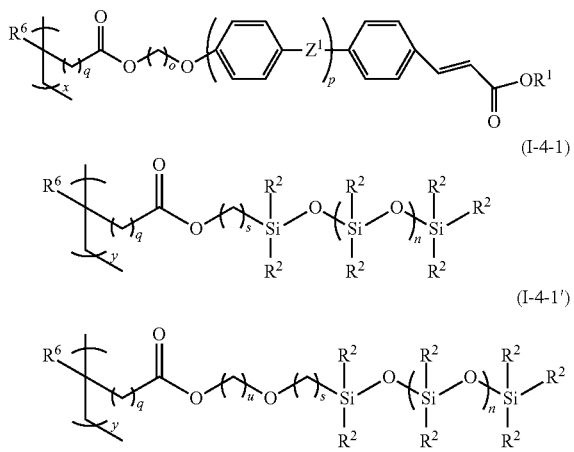

wherein $R^1$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^2$ represents hydrogen or an alkyl group having 1 to 5 carbons in which arbitrary hydrogen may be replaced by fluorine, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: $x+y \leq 1$, and arbitrary hydrogen of a phenylene group may be replaced by fluorine, a methyl group or a methoxy group.

Formula 13

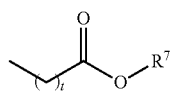
(II)

wherein $R^7$ represents hydrogen or a methyl group, and t represents 0 or 1.

Item 12. The photoalignable polymer composition according to any one of items 1 to 4, wherein the polymer of the first component includes a constitutional unit represented by formula (I-3-1') and formula (I-4-1) as described below according to item 8.

Formula 14

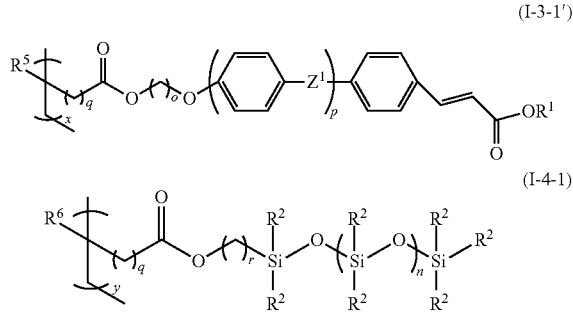

wherein $R^1$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^2$ represents hydrogen or an alkyl group having 1 to 5 carbons in which arbitrary hydrogen may be replaced by fluorine, $R^5$ represents hydrogen or a methyl group, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: $x+y \leq 1$, and arbitrary hydrogen of a phenylene group may be replaced by fluorine, a methyl group or a methoxy group.

Formula 15

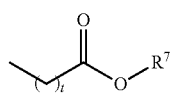
(II)

wherein $R^7$ represents hydrogen or a methyl group, and t represents 0 or 1.

Item 13. The photoalignable polymer composition according to any one of items 1 to 3, wherein the polymer of the first component includes a constitutional unit represented by formulas (I-1-1) and (I-5-1) as described below.

Formula 16

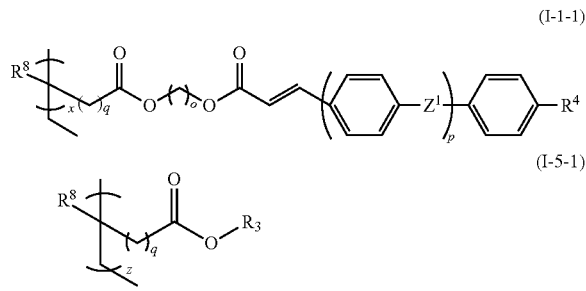

(I-1-1)

(I-5-1)

wherein $R^3$ represents an alkyl group having 1 to 20 carbons in which one or more of arbitrary hydrogen is replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^8$ represents hydrogen, a methyl group or a group represented by formula (II) as described below, $Z^1$ represents a single bond, —COO— or —OCO—, represents an integer from 2 to 6, p represents an integer from 0 to 2, q represents 0 or 1, x and z are a molar fraction, and satisfy a relationship: x+z≤1, and arbitrary hydrogen of a phenylene group may be replaced by fluorine, a methyl group or a methoxy group.

Formula 18

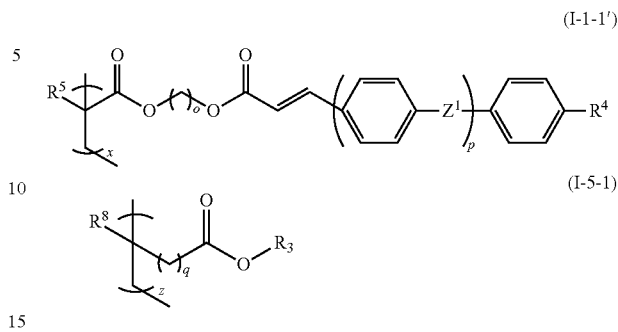

(I-1-1')

(I-5-1)

wherein $R^3$ represents an alkyl group having 1 to 20 carbons in which one or more of arbitrary hydrogen is replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^5$ represents hydrogen or a methyl group, $R^8$ represents hydrogen, a methyl group or a group represented by formula (II) as described below, $Z^1$ represents a single bond, —COO— or —OCO—, o represents an integer from 2 to 6, p represents an integer from 0 to 2, q represents 0 or 1, x and z are a molar fraction, and satisfy a relationship: x+z≤1, and arbitrary hydrogen of a phenylene group may be replaced by fluorine, a methyl group or a methoxy group.

Formula 17

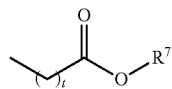

(II)

wherein $R^7$ represents hydrogen or a methyl group, and t represents 0 or 1.

Item 14. The photoalignable polymer composition according to any one of items 1 to 3, wherein the polymer of the first component includes a constitutional unit represented by formulas (I-1-1') and (I-5-1) as described below.

Formula 19

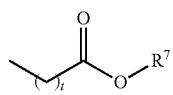

(II)

wherein $R^7$ represents hydrogen or a methyl group, and t represents 0 or 1.

Item 15. The photoalignable polymer composition according to any one of items 1 to 3, wherein the polymer of the first component includes a constitutional unit represented by formula (I-2-1) and formula (I-5-1) as described below.

Formula 20

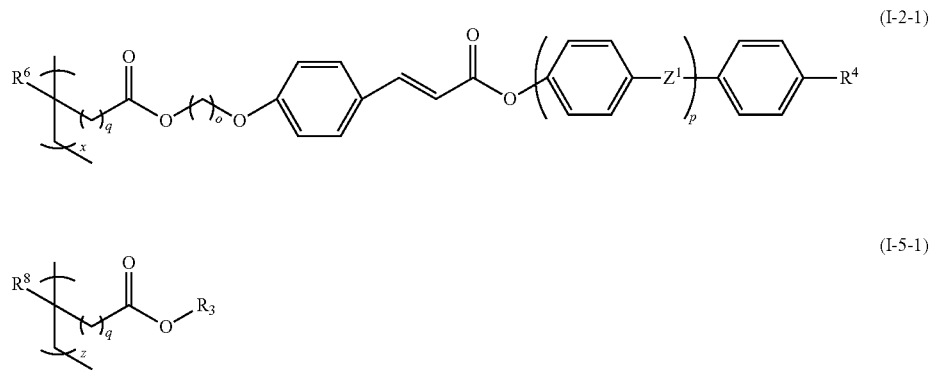

(I-2-1)

(I-5-1)

wherein R³ represents an alkyl group having 1 to 20 carbons in which one or more of arbitrary hydrogen is replaced by fluorine, R⁴ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, R⁸ represents hydrogen, a methyl group or a group represented by formula (II) as described below, Z¹ represents a single bond, —COO— or —OCO—, represents an integer from 2 to 6, p represents an integer from 0 to 2, q represents 0 or 1, x and z are a molar fraction, and satisfy a relationship: x+z≤1, and arbitrary hydrogen of a phenylene group may be replaced by fluorine, a methyl group or a methoxy group.

Formula 21

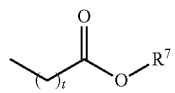

(II)

wherein R⁷ represents hydrogen or a methyl group, and t represents 0 or 1.

Item 16. The photoalignable polymer composition according to any one of items 1 to 3, wherein the polymer of the first component includes a constitutional unit represented by formula (I-2-1') and formula (I-5-1) as described below.

Formula 22

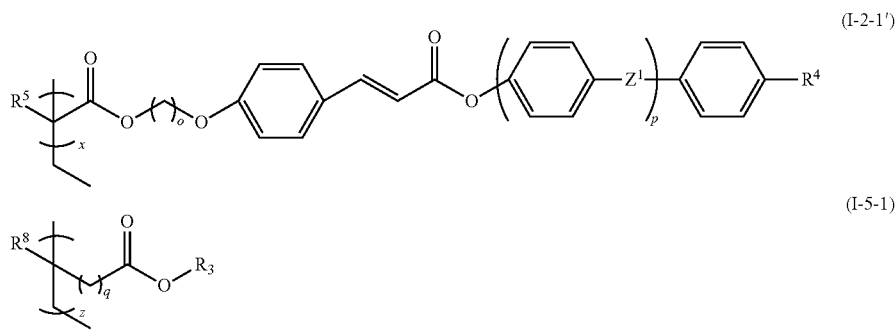

(I-2-1')

(I-5-1)

wherein R³ represents an alkyl group having 1 to 20 carbons in which one or more of arbitrary hydrogen is replaced by fluorine, R⁴ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, R⁵ represents hydrogen or a methyl group, R⁸ represents hydrogen, a methyl group or a group represented by formula (II) as described below, represents a single bond, —COO— or —OCO—, o represents an integer from 2 to 6, p represents an integer from 0 to 2, q represents 0 or 1, x and z are a molar fraction, and satisfy a relationship: x+z≤1, and arbitrary hydrogen of a phenylene group may be replaced by fluorine, a methyl group or a methoxy group.

Formula 23

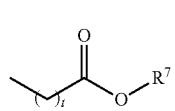

(II)

wherein R⁷ represents hydrogen or a methyl group, and t represents 0 or 1.

Item 17. The photoalignable polymer composition according to any one of items 1 to 3, wherein the polymer of the first component includes a constitutional unit represented by formula (I-3-1) and formula (I-5-1) as described below.

Formula 24

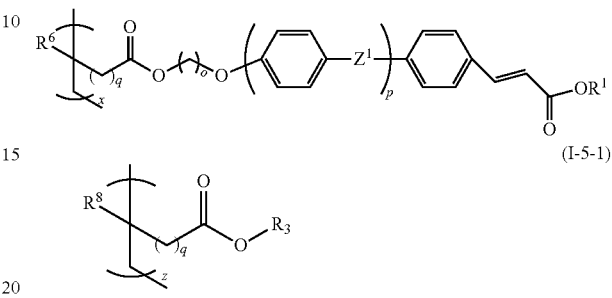

(I-3-1)

(I-5-1)

wherein R¹ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, R³ represents an alkyl group having 1 to 20 carbons in which one or more of arbitrary hydrogen is replaced by fluorine, R⁴ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, R⁸ represents hydrogen, a methyl group or a group represented by formula (II) as described below, Z¹ represents a single bond, —COO— or —OCO—, o represents an integer from 2 to 6, p represents an integer from 0 to 2, q represents 0 or 1, x and y are a molar fraction, and satisfy a relationship: x+y≤1, and arbitrary hydrogen of a phenylene group may be replaced by fluorine, a methyl group or a methoxy group.

Formula 25

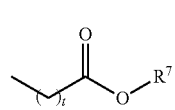

(II)

wherein R⁷ represents hydrogen or a methyl group, and t represents 0 or 1.

Item 18. The photoalignable polymer composition according to any one of items 1 to 3, wherein the polymer of the first component includes a constitutional unit represented by formula (I-3-1') and formula (I-5-1) as described below.

Formula 26

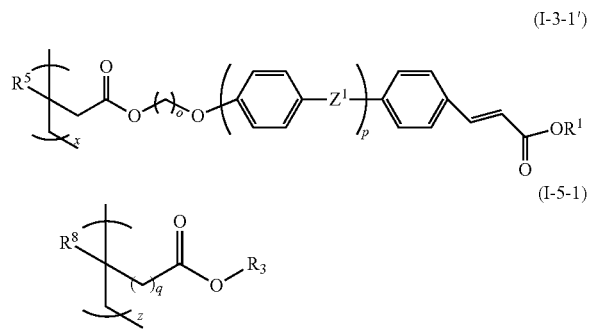

(I-3-1')

(I-5-1)

wherein $R^1$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^3$ represents an alkyl group having 1 to 20 carbons in which one or more of arbitrary hydrogen is replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^5$ represents hydrogen or a methyl group, $R^8$ represents hydrogen, a methyl group or a group represented by formula (II) as described below, $Z^1$ represents a single bond, —COO— or —OCO—, o represents an integer from 2 to 6, p represents an integer from 0 to 2, q represents 0 or 1, x and y are a molar fraction, and satisfy a relationship: $x+y \leq 1$, and arbitrary hydrogen of a phenylene group may be replaced by fluorine, a methyl group or a methoxy group.

Formula 27

(II)

wherein $R^7$ represents hydrogen or a methyl group, and t represents 0 or 1.

Item 19. The photoalignable polymer composition according to any one of items 1 to 4, wherein the polymer of the first component has a photoalignable group represented by general formula (I-3) described above, and a silicone group represented by general formula (I-4) described above in which $R^2$ is a methyl group.

Item 20. The photoalignable polymer composition according to any one of items 1 to 4, 6 to 12 and 19, wherein the polymer of the first component has a silicone group and molecular weight of the silicone group is 50,000 or less.

Item 21. The photoalignable polymer composition according to any one of items 1 to 4, 6 to 12 and 19, wherein the polymer of the first component has a silicone group and molecular weight of the silicone group is 10,000 or less.

Item 22. The photoalignable polymer composition according to any one of items 1 to 4, 6 to 12, and 19 to 21, wherein the polymer of the first component has a silicone group, and the polymer is obtained by polymerizing a monomer mixture containing a monomer having the silicone group in the range of 0.01 to 50% by weight based on the total monomers.

Item 23. The photoalignable polymer composition according to any one of items 1 to 3, 5, and 13 to 18, wherein the polymer of the first component has a fluorine-substituted alkyl group, and the polymer is obtained by polymerizing a monomer mixture containing a monomer having the fluorine-substituted alkyl group in the range of 0.01 to 50% by weight based on the total monomers.

Item 24. The photoalignable polymer composition according to any one of items 1 to 23, wherein a mass ratio of the first component to the second component {(first component):(second component)} is 1:99 to 50:50.

Item 25. The photoalignable polymer composition according to any one of items 1 to 23, wherein a mass ratio of the first component to the second component {(first component):(second component)} is 5:95 to 30:70.

Item 26. The photoalignable polymer composition according to any one of items 1 to 25, containing at least one material selected from a sensitizer and a crosslinking agent in the range of 1 to 100% by weight based on the total weight of the first component and the second component.

Item 27. The photoalignable polymer composition according to any one of items 1 to 26, further containing a glycol solvent or a glycol ether solvent that can dissolve the first component and the second component.

Item 28. A liquid crystal alignment film, formed of the photoalignable polymer composition according to any one of items 1 to 27.

Item 29. An optical device, comprising a phase difference plate obtained using the photoalignable polymer composition according to any one of items 1 to 27.

Item 30. A patterned phase difference plate, formed of the photoalignable polymer composition according to any one of items 1 to 27.

Advantageous Effects of Invention

A photoalignable polymer composition of the invention contains a specific photoalignable polymer and a specific non-photoalignable polymer. Therefore, a photoalignable film obtained by applying a photoaligning agent including the composition to a base material or the like and drying an applied surface thereon has an excellent sensitivity to allow photoalignment even with exposure in a short period of time. Furthermore, a liquid crystal alignment film is formed by a photoalignment method. Therefore, a complicated treatment process is not required, and neither dust nor static electricity is subsequently generated, while the complicated process and generation of dust and static electricity are seen in a rubbing treatment that has been applied so far. Therefore, a liquid crystal alignment film having a high optical uniformity without an alignment defect can be prepared. Thus, a phase difference plate manufactured using the liquid crystal alignment film can keep a high alignment stability.

DESCRIPTION OF EMBODIMENTS

The invention will be explained in detail.

A photoalignable polymer composition of the invention is characterized by containing a first component being a polymer (hereinafter, referred to as "photoalignable polymer") having a silicone group or a fluorine-substituted alkyl group, and a photoalignable group, and a second component being a non-photoalignable polymer obtained by polymerizing a monomer containing at least one kind selected from the group of methacrylic acid and methacrylate.

The photoalignable polymer contained as the first component is a polymer in which a change of a molecular structure in the polymer can occur to cause anisotropy by irradiation with light, for example, plane polarized light, typically, a polymer in which at least one photoreaction selected from a photoisomerization reaction, a photodimerization reaction and a photolytic reaction is caused by irradiation with light, for example, plane polarized light. Moreover, the photoalignable group means a group in which a change of a molecular structure in the group can occur by irradiation with light, for example, plane polarized light, typically, a group in which at least one photoreaction selected from a photoisomerization reaction, a photodimerization reaction and a photolytic reaction is caused by irradiation with light, for example, plane polarized light. Among the photoalignable groups, a group that causes the photoisomerization reaction and a group that causes the photodimerization reaction are preferred, and the group that causes the photodimerization reaction is further preferred.

The photoisomerization reaction means a reaction that causes steric isomerization or structural isomerization by action of light. As a material that causes the photoisomerization reaction, such a material is known as a material having a cinnamic acid skeleton (K. Ichimura et al., Macromolecules, 30, 903 (1997)), a material having an azobenzene skeleton (K. Ichimura et al., Mol. Cryst. Liq. Cryst., 298, 221 (1997)), a material having a hydrazono-β-ketoester skeleton (S. Yamamura et al., Liquid Crystals, Vol. 13, No. 2, page 189 (1993)), a material having a stilbene skeleton (J. G. Victor and J. M. Torkelson, Macromolecules, 20, 2241 (1987)), and a material having a spiropyran skeleton (K. Ichimura et al., Chemistry Letters, page 1063 (1992); K. Ichimura et al., Thin Solid Films, Vol. 235, page 101 (1993)).

As the group that causes the photoisomerization reaction, a group that includes a C═C bond or N═N bond to cause the photoisomerization reaction is preferred. Specific examples of such a group include a group having a cinnamic acid skeleton, a group having an azobenzene skeleton, a group having a hydrazono-β-ketoester skeleton, a group having a stilbene skeleton, and a group having a spiropyran skeleton. The groups may be included in a polymer main chain or a side chain.

The photodimerization reaction means a reaction in which an addition reaction occurs between two groups by action of light, and typically, a ring structure is formed. As a material that causes the photodimerization, such a material is known as a material having a cinnamic acid skeleton (M. Schadt et al., J. Appl. Phys., Vol. 31, No. 7, page 2155 (1992), a material having a coumarin skeleton (M. Schadt et al., Nature., Vol. 381, page 212 (1996)), a material having a chalcone skeleton (Toshihiro Ogawa et al., Preprints of Symposium on Liquid Crystals (Ekisho Toronkai Koen Yokoshu in Japanese), 2AB03 (1997)), and a material having a benzophenone skeleton (Y. K. Jang et al., SID Int. Symposium Digest, P-53 (1997)).

Specific examples of the group that causes the photodimerization reaction include a group having a cinnamic acid skeleton, a group having a coumarin skeleton, a group having a chalcone skeleton, and a group having a benzophenone skeleton. Among the groups, the group having the cinnamic acid skeleton or the group having the coumarin skeleton is preferred, and the group having the cinnamic acid skeleton is further preferred. The groups may be included in the polymer main chain or the side chain, but is preferably included in the side chain.

Specific examples of the group having the cinnamic acid skeleton include a group having at least one kind of structures represented by general formulas (I-1) to (I-3) as described below.

Formula 28

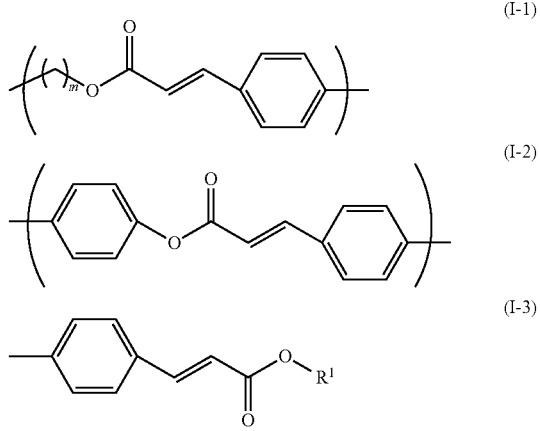

wherein $R^1$ represents hydrogen or an alkyl group having 1 to 5 carbons in which arbitrary hydrogen may be replaced by fluorine, preferably, a methyl group. Then, m represents an integer from 0 to 6, and m in formula (I-1) preferably represents 2, 4 or 6. Arbitrary hydrogen of a phenylene group included in the formulas may be replaced by fluorine, a methyl group or a methoxy group. Among the groups represented by the formulas (I-1) to (I-3), a group represented by the formula (I-3) is preferred.

The photoalignable polymer further has the silicone group or the fluorine-substituted alkyl group. The groups are included in the photoalignable polymer. Thus, upon applying the photoalignable polymer composition containing the photoalignable polymer and the non-photoalignable polymer as described later to the base material, the photoalignable group can be concentrated on a surface in contact with ambient air.

Specific examples of the silicone group include a group represented by general formula (I-4) as described below.

Formula 29

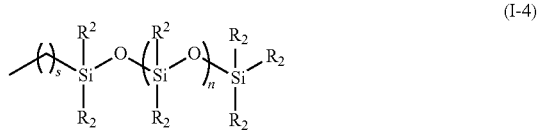

wherein $R^2$ represents hydrogen or an alkyl group having 1 to 5 carbons in which arbitrary hydrogen may be replaced by fluorine, preferably, a methyl group or a butyl group. Then, s represents an integer from 0 to 6, preferably, 2 or 3. Then, n represents an integer from 1 to 200, preferably, an integer from 1 to 100.

Molecular weight of the silicone group included in the photoalignable polymer is not particularly limited, as long as advantageous effects of the invention are produced, but is preferably 50,000 or less, further preferably, 10,000 or less, still further preferably, 5,000 or less, and preferably 400 or more, further preferably, 500 or more.

Specific examples of the fluorine-substituted alkyl group include a group represented by general formula (I-5) as described below.

Formula 30

$$-R^3 \tag{I-5}$$

wherein $R^3$ represents an alkyl group having 1 to 20 carbons in which one or more of arbitrary hydrogen is replaced by fluorine, preferably, an alkyl group having 6 to 12 carbons.

Specific examples of the fluorine-substituted alkyl group represented by general formula (I-5) described above include 1H,1H,2H,2H-nonafluoroheptyl, 1H,1H,2H,2H-heptadecafluorodecyl, 1H,1H,7H-dodecafluoroheptyl, 1H,1H,2H,2H-tridecafluorooctyl, 1H,1H-perfluorononyl and 1H,1H,2H,2H-perfluorododecyl. Among the fluorine-substituted alkyl groups, 1H,1H,2H,2H-heptadecafluorodecyl or 1H,1H,2H,2H-tridecafluorooctyl is preferred.

A plurality of silicone groups or fluorine-substituted alkyl groups may be included in the photoalignable polymer, and both the fluorine-substituted alkyl group and the silicone group may be included therein.

The photoalignable polymer forming the first component can be manufactured by copolymerizing, for example, a monomer having the photoalignable group, and a monomer having the silicone group or a fluoroalkyl group, and as required, any other monomer.

Specific examples of the monomer having the photoalignable group include a monomer forming a constitutional unit represented by formulas (I-1-1), (I-2-1) or (I-3-1) as described below upon being incorporated into the polymer.

having 1 to 5 carbons in which arbitrary hydrogen may be replaced by fluorine or an alkoxy group having 1 to 5 carbons in which arbitrary hydrogen may be replaced by fluorine, further preferably, a methyl group. In the formulas, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, preferably, an alkyl group having 1 to 5 carbons in which arbitrary hydrogen may be replaced by fluorine or an alkoxy group having 1 to 5 carbons in which arbitrary hydrogen may be replaced by fluorine, further preferably, a methyl group or a methoxy group. In the formulas, $R^6$ represents hydrogen, a methyl group or a group represented by formula (II) as described below. In the formulas, $Z^1$ represents a single bond, —COO— or —OCO—, preferably, —COO—. In the formulas, o represents an integer from 2 to 6, preferably, 2, 4 or 6, and p represents an integer from 0 to 2, preferably, 0. Arbitrary hydrogen of a phenylene group included in the formula may be replaced by fluorine, a methyl group or a methoxy group, but is preferably an unsubstituted group or methoxy-substituted group.

Formula 32

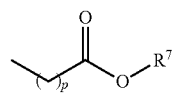
(II)

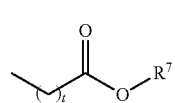
(II)

wherein $R^7$ represents hydrogen or a methyl group, and t or p represents 0 or 1.

Formula 31

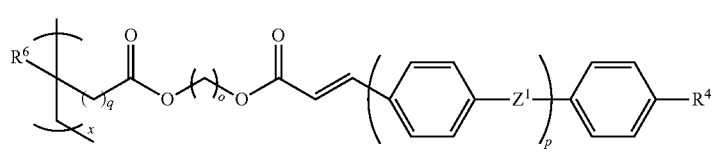
(I-1-1)

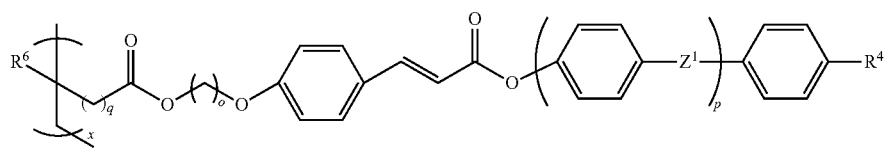
(I-2-1)

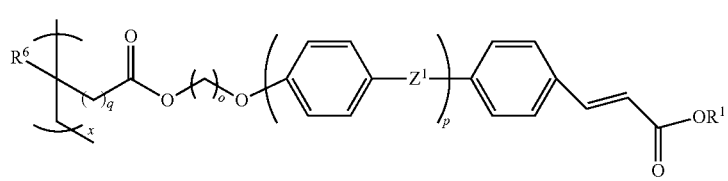
(I-3-1)

wherein a parenthesized moiety subscribed with x represents a moiety to be included in the polymer main chain, and x represents a molar fraction (x<1) of the constitutional unit included in the photoalignable polymer. In the formula, $R^1$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, preferably, an alkyl group Specific preferred embodiments of the constitutional unit represented by formulas (I-1-1), (I-2-1) or (I-3-1) described above include a constitutional unit represented by formulas (I-1-1'), (I-2-1') or (I-3-1')

Formula 33

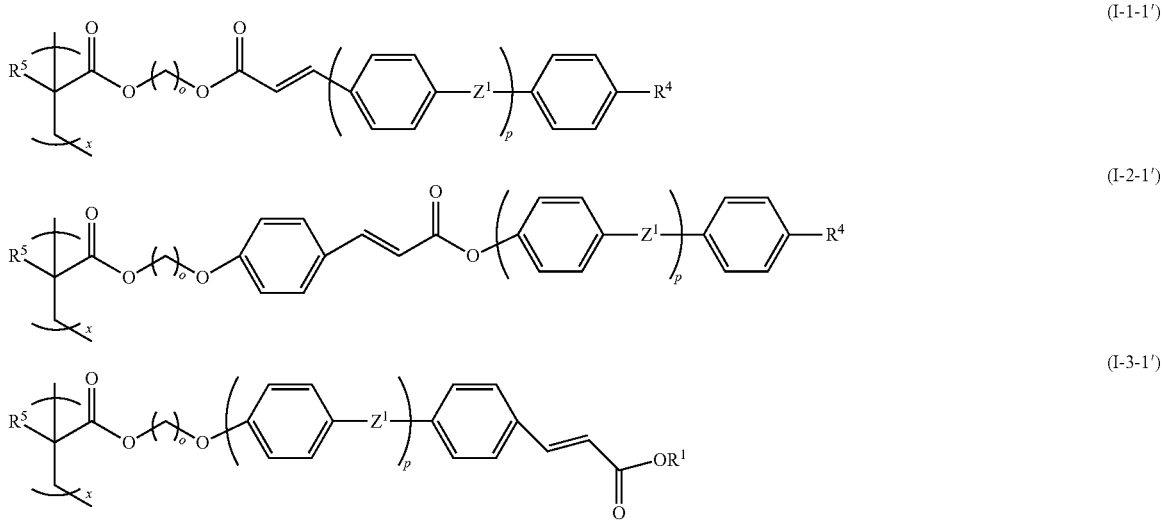

In the formulas, definitions and preferred embodiments of x, $R^1$, $R^4$, $Z^1$, o and p are provided in a manner similar to the cases of formulas (I-1-1), (I-2-1) and (I-3-1) described above. In the formulas, $R^5$ represents hydrogen or a methyl group, preferably, a methyl group.

Specific examples of a photoalignable monomer forming the constitutional unit represented by formula (I-1-1) described above include monomers represented by formulas (I-1-1-a) to (I-1-1-l) and formulas (I-1-1-m) to (I-1-1-x) as described below (wherein $R^9$ represents hydrogen or a methyl group, and $R^{10}$ represents an alkyl group having 1 to 20 carbons).

Formula 34

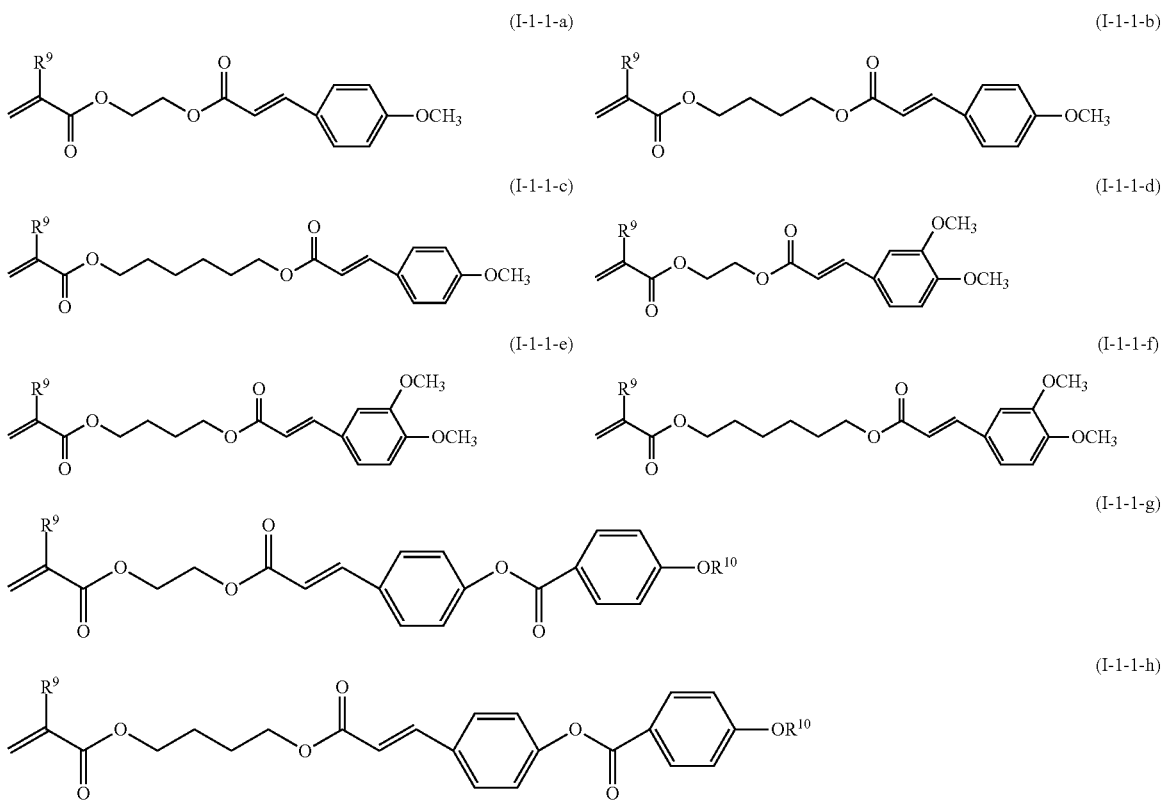

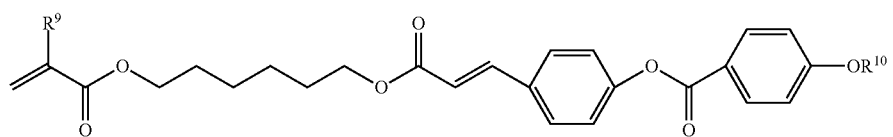
(I-1-1-i)
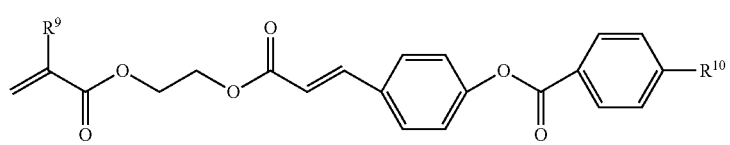
(I-1-1-j)
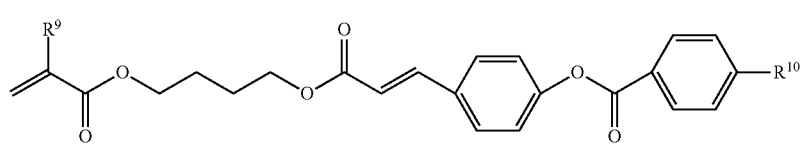
(I-1-1-k)
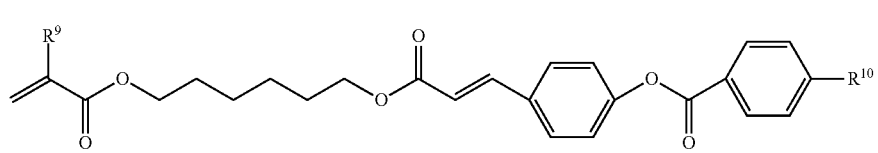
(I-1-1-l)
Formula 35
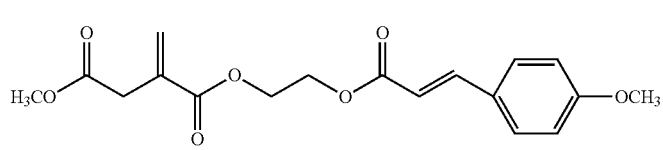
(I-1-1-m)
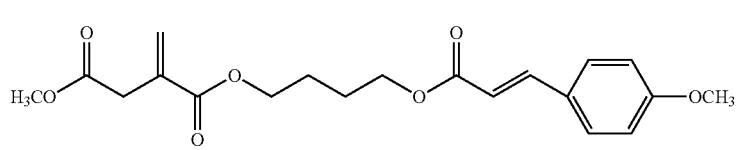
(I-1-1-n)
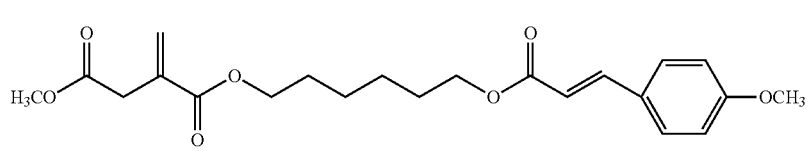
(I-1-1-o)
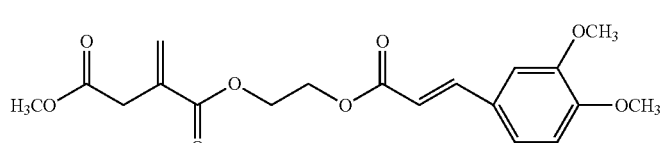
(I-1-1-p)
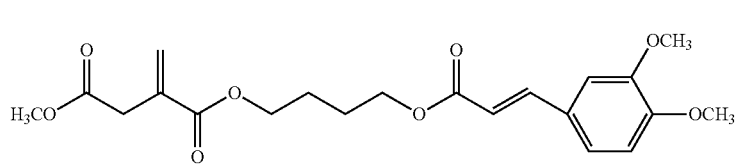
(I-1-1-q)
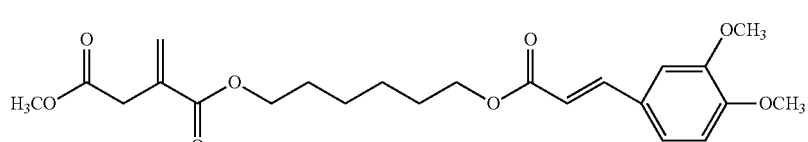
(I-1-1-r)

-continued
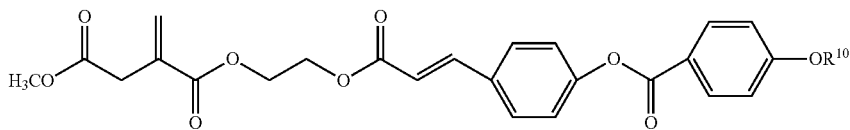
(I-1-1-s)
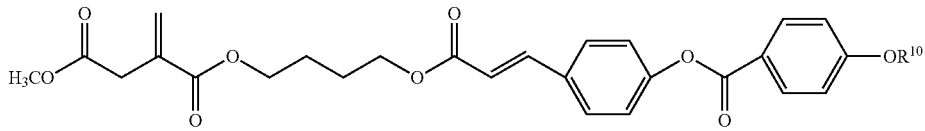
(I-1-1-t)
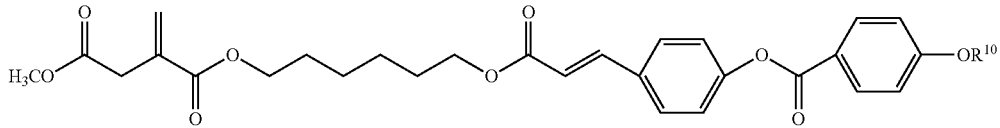
(I-1-1-u)
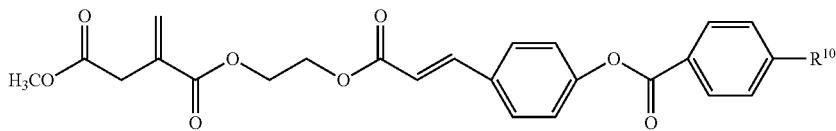
(I-1-1-v)
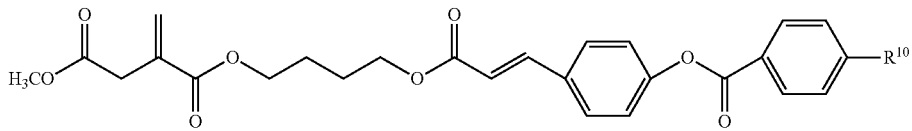
(I-1-1-w)
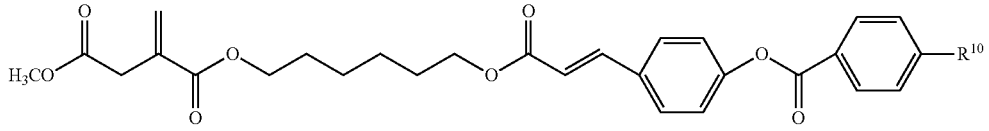
(I-1-1-x)
Specific examples of a photoalignable monomer forming the constitutional unit represented by formula (I-2-1) described above include monomers represented by formulas (I-2-1-a) to (I-2-1-l) and formulas (I-2-1-m) to (I-2-1-x) as described below (wherein $R^9$ represents hydrogen or a methyl group, and $R^{10}$ represents an alkyl group having 1 to 20 carbons).
Formula 36
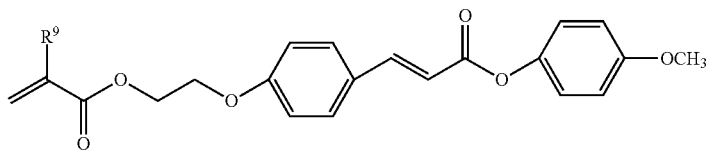
(I-2-1-a)
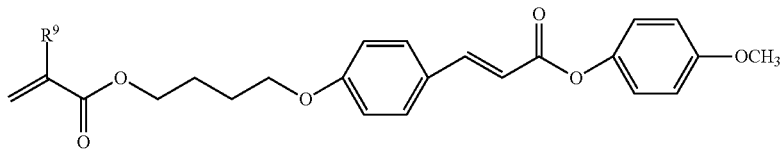
(I-2-1-b)
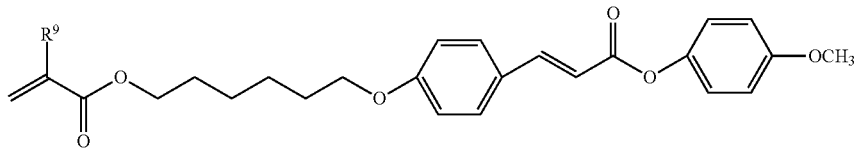
(I-2-1-c)

-continued
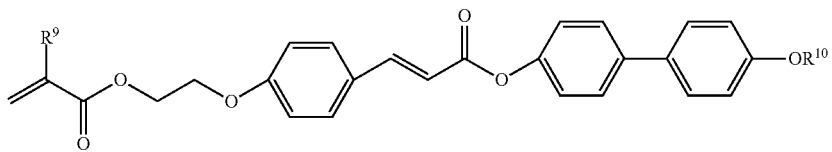
(I-2-1-d)
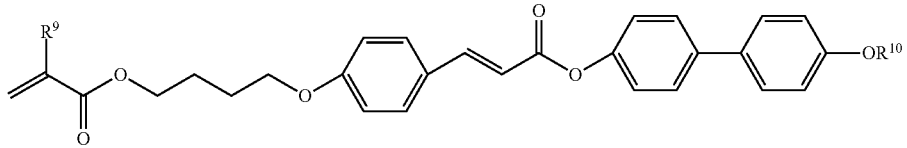
(I-2-1-e)
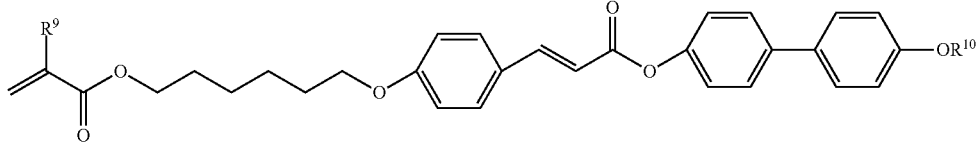
(I-2-1-f)
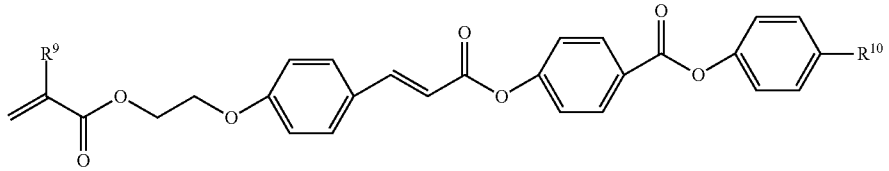
(I-2-1-g)
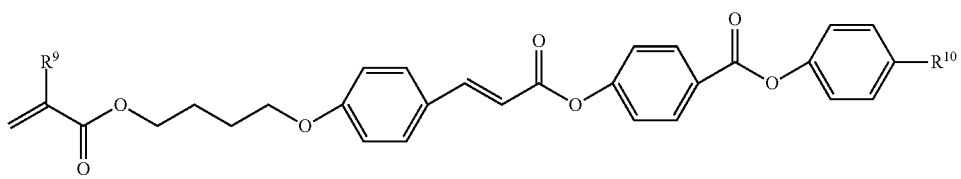
(I-2-1-h)
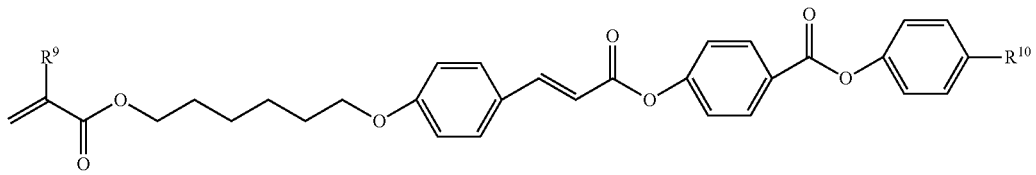
(I-2-1-i)
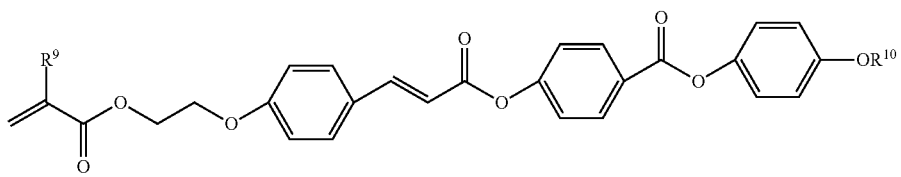
(I-2-1-j)
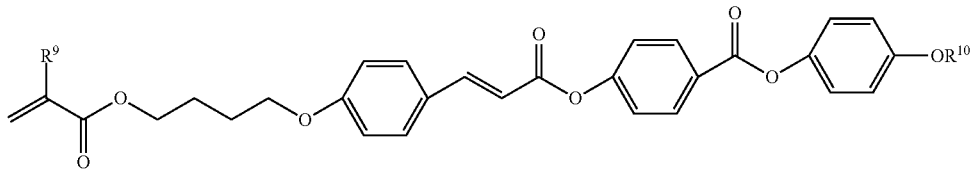
(I-2-1-k)
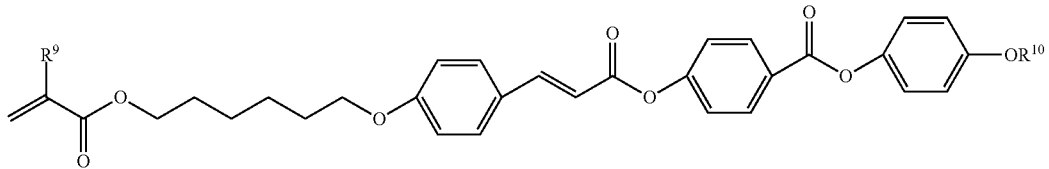
(I-2-1-l)

-continued
Formula 37
(I-2-1-m)
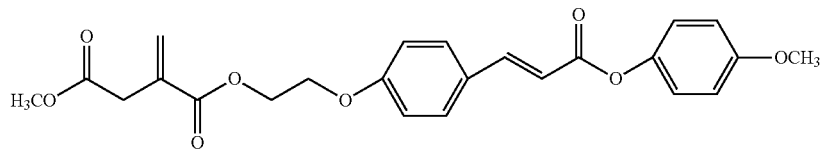
(I-2-1-n)
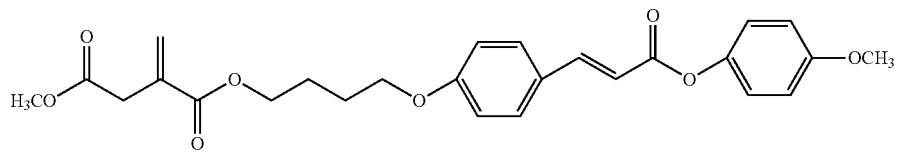
(I-2-1-o)
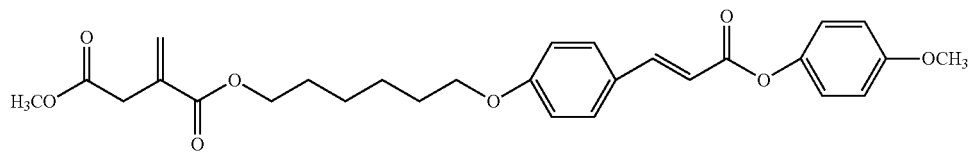
(I-2-1-p)
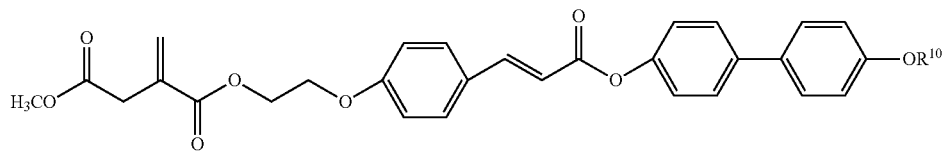
(I-2-1-q)
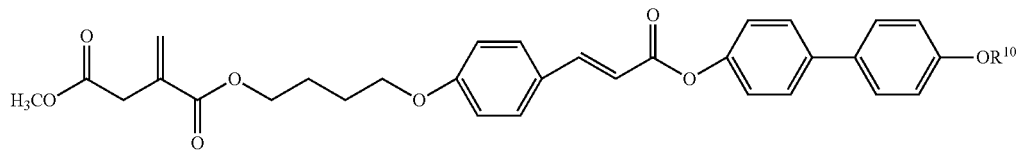
(I-2-1-r)
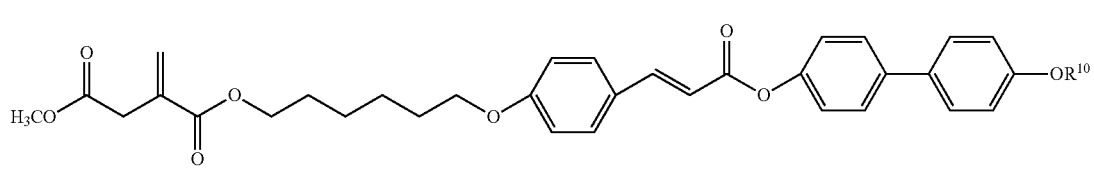
(I-2-1-s)
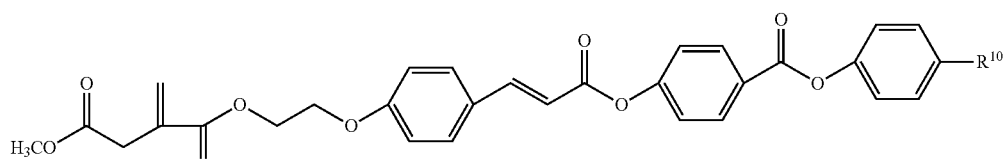
(I-2-1-t)
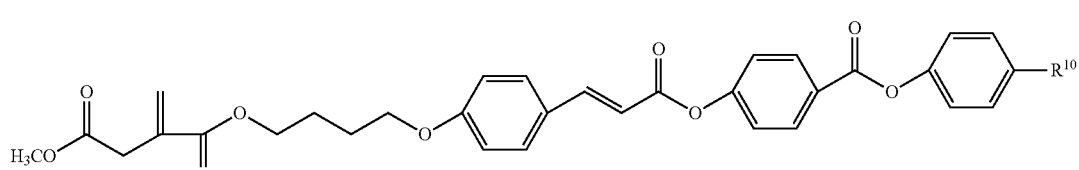
(I-2-1-u)
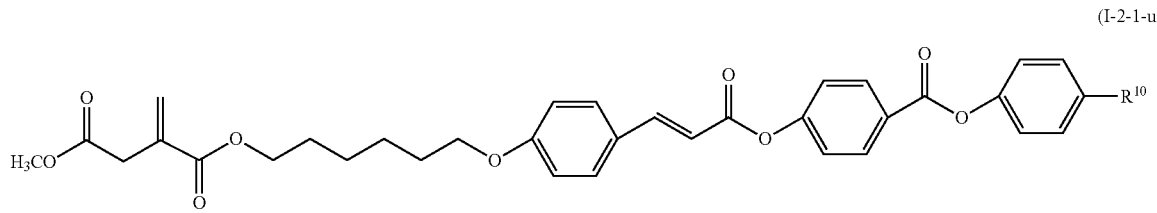

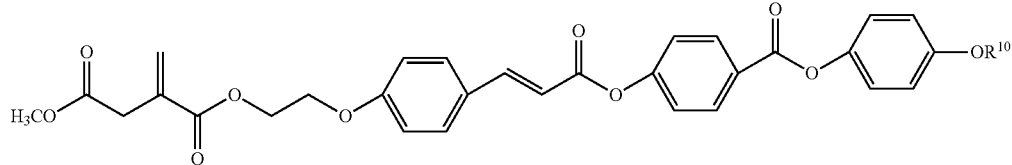
(I-2-1-v)
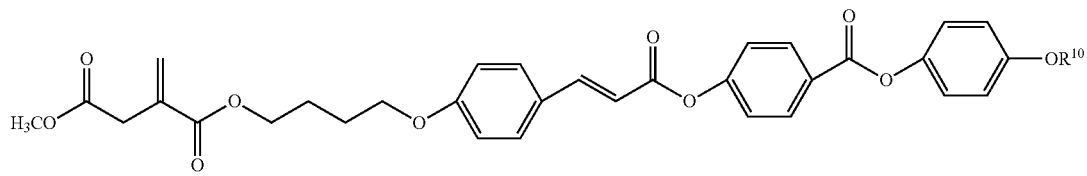
(I-2-1-w)
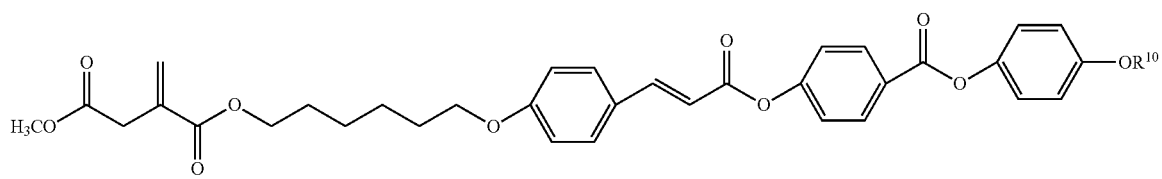
(I-2-1-x)
Specific examples of a photoalignable monomer forming the constitutional unit represented by formula (I-3-1) described above include monomers represented by formulas (I-3-1-a) to (I-3-1-i) and formulas (I-3-1-j) to (I-3-1-r) as described below (wherein $R^9$ represents hydrogen or a methyl group, and $R^{10}$ represents an alkyl group having 1 to 20 carbons).
Formula 38
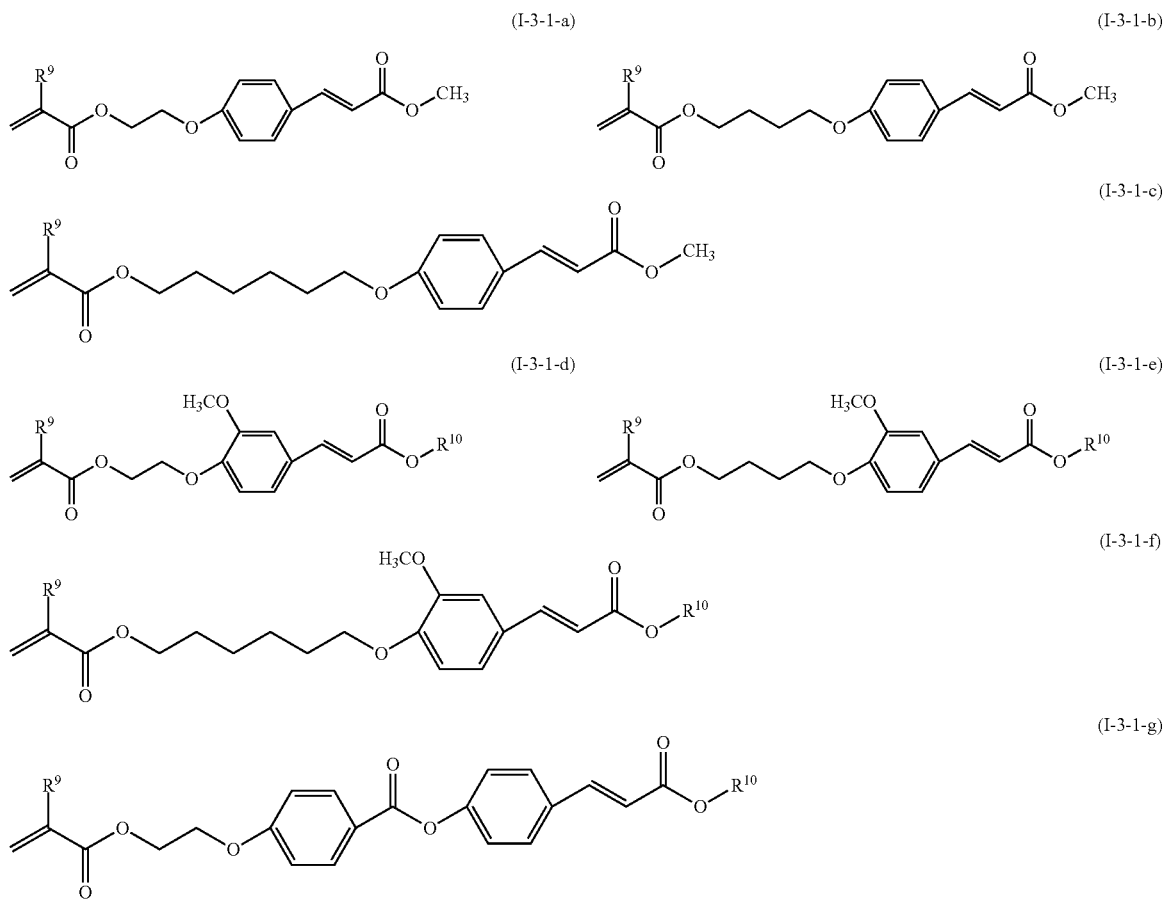

-continued
(I-3-1-h)
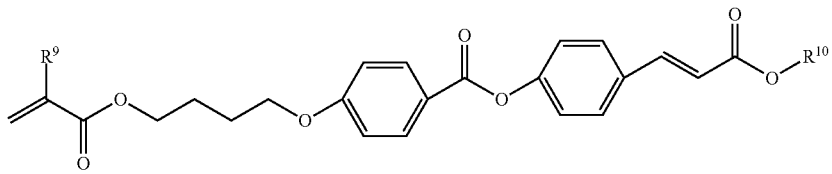
(I-3-1-i)
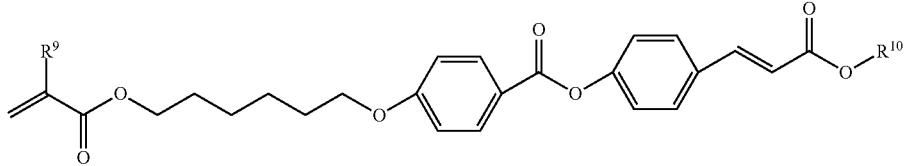
Formula 39
(I-3-1-j)
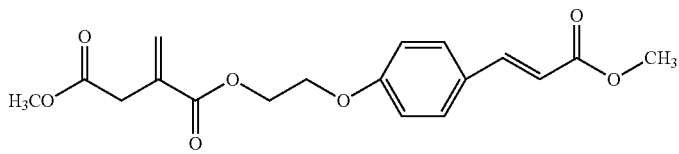
(I-3-1-k)
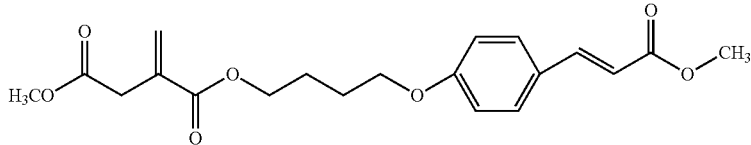
(I-3-1-l)
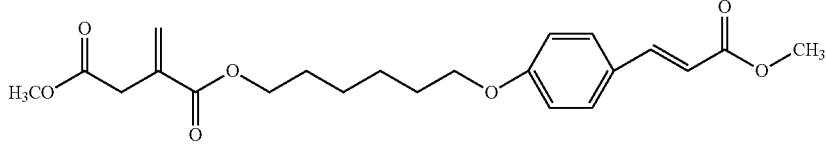
(I-3-1-m)
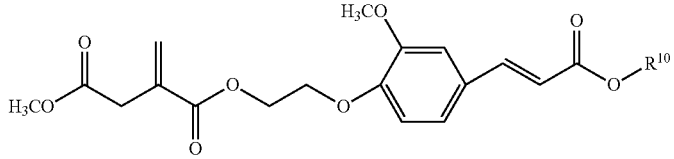
(I-3-1-n)
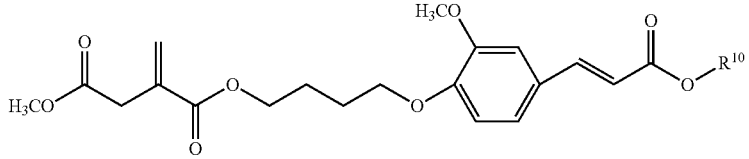
(I-3-1-o)
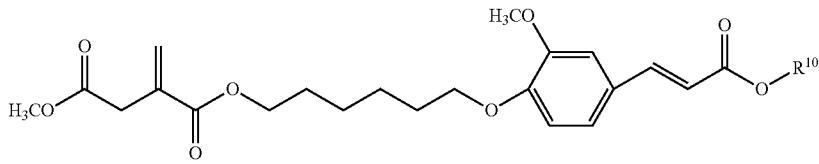
(I-3-1-p)
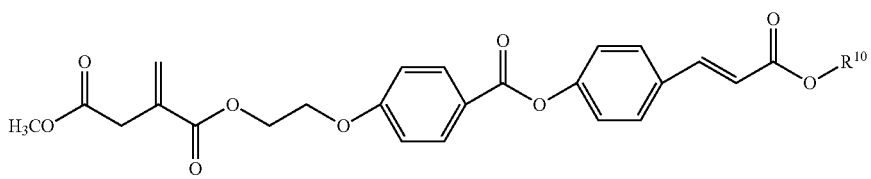

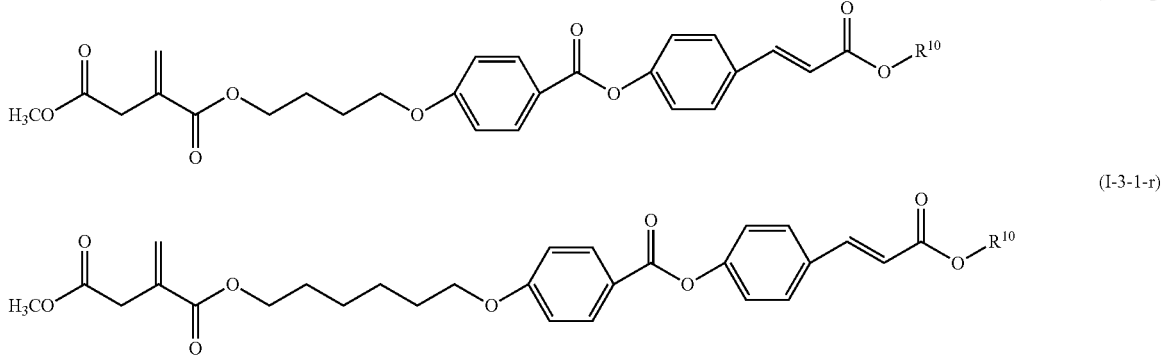

Among the monomers, a photoalignable monomer forming the constitutional unit represented by formula (I-3-1) described above is preferred, and a photoalignable monomer forming the constitutional unit represented by formula (I-3-1) described above in which $R^5$ represents a methyl group, o is 2, p is 0 and $R^1$ represents a methyl group is further preferred.

Among total monomer mixtures to be used, the content of the monomer having the photoalignable group is ordinarily in the range of approximately 20% by weight or more and less than approximately 100% by weight, preferably, in the range of approximately 40 to approximately 99.99% by weight, further preferably, in the range of approximately 60 to approximately 99.9% by weight, based on the total monomers.

Specific examples of the monomer having the silicone group include a monomer forming the constitutional unit represented by formula (I-4-1) or (I-4-1') as described below upon being incorporated into the polymer.

Formula 40

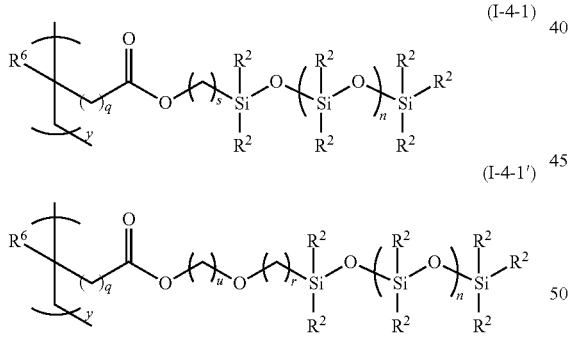

wherein a parenthesized moiety subscribed with y represents a moiety to be included in the polymer main chain, and y represents a molar fraction (y<1) of the constitutional unit included in the photoalignable polymer. In the formula, $R^2$ represents hydrogen, an alkyl group having 1 to 5 carbons in which arbitrary hydrogen may be replaced by fluorine, preferably, a methyl group or a butyl group. In the formula, $R^6$ represents hydrogen, a methyl group or a group represented by formula (II) as described below. In the formula, s represents an integer from 0 to 6, preferably, 2 or 3, n represents an integer from 1 to 200, preferably, an integer from 1 to 100, and q represents 0 or 1. In the formula, when q=0, $R^6$ preferably represents a methyl group or a group represented by formula (II), and when q=1, $R^6$ preferably represents a group represented by formula (II).

Formula 41

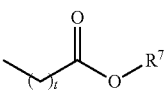

wherein $R^7$ represents hydrogen or a methyl group, preferably, hydrogen, and t is 0 or 1. In the formula, when q=1 in formula (1-4-1) described above, t is 0, and when q=0 in formula (1-4-1) described above, t is 1 and $R^7$ is a methyl group.

Specific examples of the monomer having the silicone group include monomers represented by formulas (I-4-1-a) to (I-4-1-c) as described below (wherein $R^{11}$ represents an alkyl group having 1 to 5 carbons, r represents 2 or 3, and n represents an integer from 1 to 100)

Formula 42

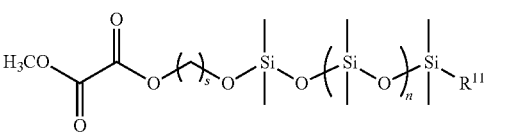

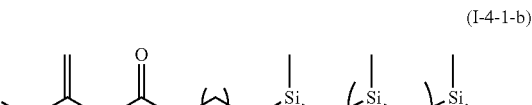

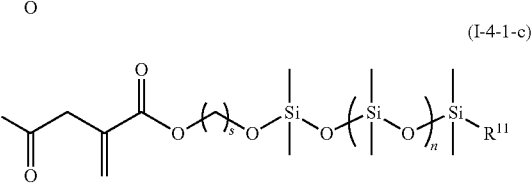

Among the monomers, a monomer represented by formulas (I-4-1-a) to (I-4-1-c) described above in which s is 3 and $R^{11}$ is a butyl group is preferred. In addition, weight average molecular weight of the monomer having the silicone group is not particularly limited, as long as the advantageous effects of the invention are produced, but is preferably 50,000 or less, further preferably, 10,000 or less, still further preferably, 5,000 or less, and preferably 400 or more, further preferably, 500 or more. Moreover, the molecular weight of the silicone group means a value obtained by subtracting the molecular weight of the polymerizable group from the weight average molecular weight of the monomer.

Among the total monomer mixtures to be used, the content of the monomer having the silicone group is preferably in the range of approximately 0.01 to approximately 50% by weight, further preferably, in the range of approximately 0.1 to approximately 10% by weight, based on the total monomers. When the content of the monomer having the silicone group is within the range, the photoalignable group tends to be further easily concentrated on the surface in touch with ambient air upon applying the photoalignable polymer composition onto the base material or the like.

Specific examples of the monomer having the fluorine-substituted alkyl group include a monomer forming the constitutional unit represented by formula (I-5-1) as described below upon being incorporated into the polymer.

Formula 43

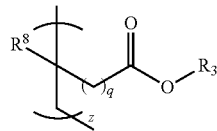

(I-5-1)

wherein a parenthesized moiety subscribed with z represents a moiety to be included in the polymer main chain, and z represents a molar fraction (z<1) of the constitutional unit included in the photoalignable polymer. In the formula, $R^3$ represents an alkyl group having 1 to 20 carbons in which one or more of arbitrary hydrogen is replaced by fluorine, preferably, an alkyl group having 6 to 12 carbons. In the formula, $R^8$ represents hydrogen, a methyl group or a group represented by formula (II) as described below, preferably, a methyl group or a group represented by formula (II). In the formula, q represents 0 or 1. In the formula, when q=0, $R^6$ preferably represents a methyl group or a group represented by formula (II), and when q 1, $R^6$ preferably represents a group represented by formula (II).

Formula 44

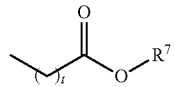

(II)

wherein $R^7$ represents hydrogen or a methyl group, preferably, hydrogen, and t is 0 or 1. In the formula, when q=0 in formula (1-4-1) described above, t is preferably 1 and $R^7$ is preferably a methyl group.

As the monomer having the fluorine-substituted alkyl group, such a vinyl monomer having a fluorine-substituted alkyl group can be used as acrylate, methacrylate, acrylamide, methacrylamide, vinyl ether, a styrene derivative, vinyl ester, a maleic acid derivative, maleimides, a fumaric acid derivative and itaconic acid. Among the vinyl monomers, methacrylate having a fluorine-substituted alkyl group and an itaconic acid derivative having a fluorine-substituted alkyl group are preferred.

Specific examples of the methacrylate having the fluorine-substituted alkyl group include 1H,1H,2H,2H-nonafluoroheptyl methacrylate, 1H,1H,2H,2H-heptadecafluorodecyl methacrylate, 1H,1H,7H-dodecafluoroheptyl methacrylate, 1H,1H,2H,2H-tridecafluorooctyl methacrylate, 1H,1H-perfluorononyl methacrylate and 1H,1H,2H,2H-perfluorododecyl methacrylate. Specific examples of the itaconic acid derivative having the fluorine-substituted alkyl group include 1H,1H,2H,2H-nonafluoroheptyl itaconate, 1H,1H,2H,2H-heptadecafluorodecyl itaconate, 1H,1H,7H-dodecafluoroheptyl itaconate, 1H,1H,2H,2H-tridecafluorooctyl itaconate, 1H,1H-perfluorononyl itaconate, 1H,1H,2H,2H-perfluorododecyl itaconate, methyl 1H,1H,2H,2H-nonafluoroheptyl itaconate, methyl 1H,1H,2H,2H-heptadecafluorodecyl itaconate, methyl 1H,1H,7H-dodecafluoroheptyl itaconate, methyl 1H,1H,2H,2H-tridecafluorooctyl itaconate, methyl 1H,1H-perfluorononyl itaconate and methyl 1H,1H,2H,2H-perfluorododecyl itaconate. Among types of the methacrylate having the fluorine-substituted alkyl group and the itaconic acid derivative having the fluorine-substituted alkyl group, 1H,1H,2H,2H-heptadecafluorodecyl methacrylate, 1H,1H,2H,2H-tridecafluorooctyl methacrylate, 1H,1H,2H,2H-heptadecafluorodecyl itaconate or 1H,1H,2H,2H-tridecafluorooctyl itaconate is preferred.

Among the total monomer mixtures to be used, the content of the monomer having the fluorine-substituted alkyl group is preferably in the range of approximately 0.01 to approximately 50% by weight, further preferably, in the range of approximately 1 to approximately 10% by weight, based on the total monomers. When the content of the monomer having the fluorine-substituted alkyl group is within the range, the photoalignable group tends to be further easily concentrated on the surface in touch with ambient air upon applying the photoalignable polymer composition to the base material or the like.

The photoalignable polymers manufactured from the monomer mixtures preferably include photoalignable polymers including constitutional units represented by formulas (I-1-1) and (I-4-1) described above (satisfying a relationship: x+y≤1), photoalignable polymers including constitutional units represented by formulas (I-2-1) and (I-4-1) described above (satisfying a relationship: x+y≤1), photoalignable polymers including constitutional units represented by formulas (I-3-1) and (I-4-1) described above (satisfying a relationship: x+y≤1), photoalignable polymers including constitutional units represented by formulas (I-1-1) and (I-5-1) described above (satisfying a relationship: x+z≤1), photoalignable polymers including constitutional units represented by formulas (I-2-1) and (I-5-1) described above (satisfying a relationship: x+z≤1), and photoalignable polymers including constitutional units represented by formulas (I-3-1) and (I-5-1) described above (satisfying a relationship: x+z≤1).

The photoalignable polymers manufactured from the monomer mixtures also preferably include photoalignable polymers including constitutional units represented by formulas (I-1-1') and (I-4-1) described above (satisfying a relationship: x+y≤1), photoalignable polymers including constitutional units represented by formulas (I-2-1') and (I-4-1) described above (satisfying a relationship: x+y≤1), photoalignable polymers including constitutional units represented by formulas (I-3-1') and (I-4-1) described above (satisfying a relationship: x+y≤1), photoalignable polymers including constitutional units represented by formulas (I-1-1') and (I-5-1) described above (satisfying a relationship: x+z≤1), photoalignable polymers including constitutional units represented by formulas (I-2-1') and (I-5-1) described above (satisfying a relationship: x+z≤1), and photoalignable polymers including constitutional units represented by formulas (I-3-1') and (I-5-1) described above (satisfying a relationship: x+z≤1).

Upon manufacturing the photoalignable polymer, any other monomer may be further copolymerized as required in addition to the monomer having the photoalignable group, and the monomer having the silicone group or the fluoroalkyl group.

Specific examples of any other monomer described above include (meth)acrylic acid; alkyl mono(meth)acrylate such as methyl(meth)acrylate, ethyl(meth)acrylate, butyl(meth)acrylate and 2-ethylhexyl(meth)acrylate; aryl mono(meth)acrylate such as phenyl(meth)acrylate and benzyl(meth)acrylate; hydroxyalkyl mono(meth)acrylate such as 2-hydroxyethyl (meth)acrylate, 2-hydroxypropyl(meth)acrylate, 2-hydroxybutyl(meth)acrylate and 3-hydroxypropyl(meth)acrylate; mono(meth)acrylate including a carboxyl group and mono (meth)acrylate including a hydroxyl group, other than hydroxyalkyl mono(meth)acrylate, such as ω-carboxypolycaprolactone mono(meth)acrylate, monohydroxyethyl (meth)acrylate phthalate and 2-hydroxy-3-phenoxypropyl (meth)acrylate; polyfunctional (meth)acrylate having neither silicone group, nor fluorine-substituted alkyl group nor photoalignable group, such as 1,4-butanediol di(meth)acrylate, 1,6-hexanediol di(meth)acrylate, ethylene glycol di(meth) acrylate, neopentyl glycol di(meth)acrylate, diethylene glycol di(meth)acrylate, triethylene glycol di(meth)acrylate, polyethylene glycol di(meth)acrylate, neopentyl glycol hydroxypivalate di(meth)acrylate, trimethylolpropane tri (meth)acrylate, ethoxylated trimethylolpropane tri(meth) acrylate, ditrimethylolpropane tetra(meth)acrylate, pentaerythritol di(meth)acrylate, pentaerythritol tri(meth) acrylate, pentaerythritol tetra(meth)acrylate, dipentaerythritol penta(meth)acrylate, dipentaerythritol hexa (meth)acrylate, dicyclopentanyl di(meth)acrylate, ethoxylated hydrogenated bisphenol A di(meth)acrylate, ethoxylated bisphenol A di(meth)acrylate, ethoxylated bisphenol F di(meth)acrylate, ethoxylated bisphenol S di(meth)acrylate, hydroxypropyl di(meth)acrylate, diethylene glycol bishydroxypropyl(meth)acrylate, and monohydroxy pentaerythritol tri(meth)acrylate, and other vinyl monomers such as acrylamide, methacrylamide, vinyl ether, a styrene derivative, vinyl ester, a maleic acid derivative, maleimides, a fumaric acid derivative and an itaconic acid derivative.

In consideration of solubility of the photoalignable polymer composition in a solvent and also a relationship with polarity of the non-photoalignable polymer being the second component, any other monomers preferably include alkyl mono(meth)acrylate such as methyl(meth)acrylate, ethyl (meth)acrylate, butyl(meth)acrylate and 2-ethylhexyl(meth) acrylate; and hydroxyalkyl mono(meth)acrylate such as 2-hydroxyethyl(meth)acrylate, 2-hydroxypropyl(meth)acrylate, 2-hydroxybutyl(meth)acrylate and 3-hydroxypropyl (meth)acrylate.

Moreover, as any other monomers described above, a commercially available monofunctional monomer or polyfunctional monomer can also be used as is. Specific examples include ARONIX M-5400 (monohydroxyethyl acrylate phthalate), ARONIX M-5700 (2-hydroxy-3-phenoxypropyl acrylate), ARONIX M-215 (ethylene oxide-modified isocyanurate diacrylate), ARONIX M-220 (tripropylene glycol diacrylate), ARONIX M-245 {polyethylene glycol(n≈9)diacrylate}, ARONIX M-305 (pentaerythritol triacrylate), ARONIX M-309 (trimethylolpropane triacrylate), ARONIX M-315 (ethylene oxide-modified isocyanurate triacrylate), ARONIX M-400 {mixture of dipentaerythritol pentaacrylate and dipentaerythritol hexaacrylate (main component)}, ARONIX M-450 (pentaerythritol tetraacrylate), ARONIX M-8060 and ARONIX M-8560 as made by Toagosei Chemical Industry Co., Ltd.; BISCOAT #295 (trimethylolpropane triacrylate), BISCOAT #300 (pentaerythritol triacrylate), BISCOAT #360 (trimethylolpropane ethylene oxide-modified triacrylate) and BISCOAT #400 (pentaerythritol tetraacrylate) as made by Osaka Organic Chemical Industry Ltd.; and KAYARAD TMPTA (trimethylolpropane triacrylate), KAYARAD PET-30 (pentaerythritol triacrylate), KAYARAD DPHA {mixture of dipentaerythritol pentaacrylate and dipentaerythritol hexaacrylate (main component)}, KAYARAD D-310 (dipentaerythritol pentaacrylate), KAYARAD D-330 and KAYARAD DPCA-60 as made by Nippon Kayaku Co., Ltd.

Any other monomers described above preferably include polyfunctional acrylate including trifunctional or higher functional acrylate, such as trimethylolpropane triacrylate, pentaerythritol triacrylate, pentaerythritol tetraacrylate, dipentaerythritol pentaacrylate, dipentaerythritol hexaacrylate, ARONIX M-305, ARONIX M-309, ARONIX M-400 and ARONIX M-450 as made by Toagosei Chemical Industry Co., Ltd., BISCOAT #295, BISCOAT #300 and BISCOAT #400 as made by Osaka Organic Chemical Industry Ltd., and KAYARAD TMPTA, KAYARAD DPHA, KAYARAD D-310 and KAYARAD PET-30 as made by Nippon Kayaku Co., Ltd.

Any other monomers described above can be used alone or by mixing two or more kinds.

A method for manufacturing the photoalignable polymer is not particularly limited. The photoalignable polymer can be manufactured by an ordinary method that is industrially applied. For example, the photoalignable polymer can be manufactured by performing cationic polymerization, radical polymerization, anionic polymerization or the like using the monomer having the photoalignable group, and the monomer having the silicone group or the fluoroalkyl group, and as required, any other monomer. Among the polymerization methods, the radical polymerization is preferred from a viewpoint of ease of reaction control.

As a polymerization initiator for the radical polymerization, various kinds of polymerization initiators such as a thermal radical polymerization initiator and a photoradical polymerization initiator can be used.

The thermal radical polymerization initiator generates a radical by heating the initiator at decomposition temperature or higher. Specific examples of the thermal radical polymerization initiator include ketone peroxides (methyl ethyl ketone peroxide and cyclohexanon peroxide), diacyl peroxides (acetyl peroxide and benzoyl peroxide), hydroperoxides (hydrogen peroxide, tert-butyl hydroperoxide and cumene hydroperoxide), dialkyl peroxides (di-tert-butyl peroxide, dicumyl peroxide and dilauroyl peroxide), peroxyketals (dibutylperoxy cyclohexane), alkyl peresters (tert-butyl peroxyneodecanoate, tert-butyl peroxypivalate and tert-amyl peroxy-2-ethylcyclohexanoate), persulfates (potassium persulfate, sodium persulfate and ammonium persulfate) and an azo compound (azobisisobutyronitril, dimethyl 2,2'-azobisisobutyrate and 2,2'-di(2-hydroxyethyl)azobisisobutyronitril). The thermal radical polymerization initiators can be used alone in one kind or in combination with two or more kinds.

The photoradical polymerization initiator generates a radical by irradiation with light. Specific examples of the photoradical polymerization initiator include benzophenone, Michler's ketone, 4,4'-bis(diethylamino)benzophenone, xanthone, thioxanthone, isopropyl xanthone, 2,4-diethyl thioxanthone, 2-ethylanthraquinone, acetophenone, 2-hydroxy-2-methylpropiophenone, 2-hydroxy-2-methyl-4'- isopropylpropiophenone, 1-hydroxycyclohexyl phenyl ketone, isopropyl benzoin ether, isobutyl benzoin ether, 2,2-diethoxyacetophenone, 2,2-dimethoxy-2-phenylacetophenone, camphorquinone, benzanthrone, 2-methyl-1-[4-(methylthio)phenyl]-2-morpholinopropane-1-one, ethyl 2-benzyl-2-dimethylamino-1-(4-morpholinophenyl)-butanone-1,4-dimethylaminobenzoate, isoamyl 4-dimethylaminobenzoate, 4,4'-di(t-butylperoxycarbonyl)benzophenone, 3,4,4'-tri(t-butylperoxycarbonyl)benzophenone, 2,4,6-trimethylbenzoyldiphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzthiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, 1-hydroxycyclohexyl phenyl ketone, bis(n5-2,4-cyclopentadiene-1-yl)-bis(2,6-difluoro-3-(1H-pyrrole-1-yl)-phenyl)titanium, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, 4,4'-di(methoxycarbonyl)-3,3'-di(t-butylperoxycarbonyl)benzophenone, 2-(3-methyl-3H-benzothiazole-2-ylidene)-1-naphthalene-2-yl-ethanone or 2-(3-methyl-1,3-benzothiazole-2 (3H)-ylidene)-1-(2-benzoyl)ethanone. The photopolymerization initiators can be used alone or in combination with two or more kinds.

A form of radical polymerization is not particularly limited. The radical polymerization can be performed in various kinds of forms such as emulsion polymerization, suspension polymerization, dispersion polymerization, precipitation polymerization, bulk polymerization and solution polymerization. In addition, with regard to a form of polymerization, polymerization methods in the cationic polymerization, the anionic polymerization or the like can also be applied in various kinds of forms in a similar manner. Other forms are described, for example, in "Synthesis of Polymers (First Volume) (Kobunshi no Gosei (Jyo) in Japanese), (edited by Takeshi Endo, Kodansha, issued in 2010).

Hereinafter, general solution polymerization as one of the forms of radical polymerization will be explained. The solution polymerization is a polymerization form in which polymerization is ordinarily performed in a solvent using a polymerization catalyst dissolvable in the solvent. The solvent in the solution polymerization can be appropriately selected according to a monomer or the like to be used. An organic solvent ordinarily includes an organic compound having a boiling point under atmospheric pressure within the range of approximately 50 to approximately 200° C., preferably, an organic compound to uniformly dissolve the monomer, components or the like produced during a polymerization process.

The solvent used in the radical polymerization is not particularly limited if the solvent does not adversely affect the radical polymerization. Specific examples include:

an aromatic compound such as benzene, toluene, xylene and ethylbenzene; an aliphatic compound such as pentane, hexane, heptane, octane, cyclohexane and cycloheptane;

alcohol such as methanol, ethanol, 1-propanol, 2-propanol and ethylene glycol;

ether such as dibutyl ether, ethylene glycol monomethyl ether, ethylene glycol dimethyl ether, tetrahydrofuran and dioxane;

ketone such as acetone, methyl ethyl ketone, methyl isobutyl ketone, cyclohexanone and cyclopentanone;

ester such as ethyl acetate, butyl acetate, amyl acetate and γ-butyrolactone;

a glycol solvent such as ethylene glycol, diethylene glycol, triethylene glycol and propylene glycol; and a glycol ether solvent such as diethylene glycol monomethyl ether, triethylene glycol monomethyl ether, propylene glycol monomethyl ether, 1-methoxy-2-propanol and 3-methoxy-3-methyl-1-butanol. In addition, the organic solvents can be used alone in one kind or in combination with two or more kinds.

From a viewpoint of control of molecular weight, control of molecular weight distribution, acceleration of polymerization or the like of the photoalignable polymer, a chain transfer agent may be used upon performing the radical polymerization. A polymer having a more uniform molecular weight distribution in a preferred molecular weight range can be obtained by using the chain transfer agent.

Specific examples of the chain transfer agent include: mercaptans such as β-mercaptopropionic acid, methyl β-mercaptopropionate, isopropylmercaptan, octylmercaptan, decylmercaptan, dodecylmercaptan, tert-dodecylmercaptan, octadecylmercaptan, thiophenol, p-nonylthiophenol, thiosalicylic acid, mercaptoacetic acid and mercapto;

alkyl halide such as carbon tetrachloride, chloroform, butyl chloride, 1,1,1-trichloroethane and 1,1,1-tribromooctane; and low-activity monomers such as α-methylstyrene and α-methylstyrene dimer. The amount of use of the chain transfer agents can be appropriately set up depending on activity of the chain transfer agent, a combination with a monomer, a solvent, polymerization temperature or the like, but is ordinarily in the range of approximately 0.01 mol % to approximately 50 mol % based on the total number of moles of monomers to be used.

Polymerization conditions upon performing the solution polymerization are not particularly limited, either. The polymerization can be performed, for example, within a temperature range of approximately 50 to approximately 200° C. for approximately 10 minutes to approximately 20 hours. From a viewpoint of avoiding deactivation of radicals, the polymerization is preferably performed under an atmosphere of an inert gas such as nitrogen.

Weight average molecular weight of the photoalignable polymer is preferably in the range of approximately 1,000 to approximately 500,000, further preferably, in the range of approximately 5,000 to approximately 200,000. In addition, the weight average molecular weight is expressed in terms of a value of a polystyrene (PS) equivalent obtained by means of gel permeation chromatography (GPC).

The photoalignable polymer being the first component may be a homopolymer of one kind or a mixture of polymers of two or more different kinds.

The photoalignable polymer composition of the invention further contains as the second component the non-photoalignable polymer in which a change of a molecular structure in the polymer cannot occur and anisotropy cannot be caused by irradiation with light, for example, with plane polarized light. In addition to the first component, the second component is contained in the photoalignable polymer composition. Thus, an improvement is allowed in characteristics such as solubility in the solvent, and an improvement is further allowed in optical characteristics such as transmittance and a color difference of a photoalignment film prepared from the polymer composition, and also in close contact of the film with the substrate, or the like. In addition, as the transmittance is closer to 100% or the color difference is closer to 0, the optical characteristics are surely more satisfactory. Moreover, the second component being the non-photoalignable polymer is contained in the photoalignable polymer composition. Thus, upon applying the photoalignment polymer composition onto the base material, the photoalignable group can be more easily concentrated on the surface in contact with ambient air.

The non-photoalignable polymer can be manufactured, for example, by polymerizing the monomer having no photoalignable group.

Specific examples of the monomer having no photoalignable group include (meth)acrylic acid; alkyl mono(meth)acrylate such as methyl(meth)acrylate, ethyl(meth)acrylate, butyl(meth)acrylate and 2-ethylhexyl(meth)acrylate; aryl mono(meth)acrylate such as phenyl(meth)acrylate and benzyl(meth)acrylate; hydroxyalkyl mono(meth)acrylate such as 2-hydroxyethyl(meth)acrylate, 2-hydroxypropyl(meth)acrylate, 2-hydroxybutyl(meth)acrylate and 3-hydroxypropyl(meth)acrylate; mono(meth)acrylate including a carboxyl group and mono(meth)acrylate including a hydroxyl group, other than hydroxyalkyl mono(meth)acrylate, such as co-carboxypolycaprolactone mono(meth)acrylate, monohydroxyethyl(meth)acrylate phthalate and 2-hydroxy-3-phenoxypropyl(meth)acrylate; methacrylate including a phenolic hydroxyl group, such as 4-hydroxyphenyl(meth)acrylate; polyfunctional (meth)acrylate having neither silicone group, nor fluorine-substituted alkyl group, nor photoalignable group, such as 1,4-butanediol di(meth)acrylate, 1,6-hexanediol di(meth)acrylate, ethylene glycol di(meth)acrylate, neopentyl glycol di(meth)acrylate, diethylene glycol di(meth)acrylate, triethylene glycol di(meth)acrylate, polyethylene glycol di(meth)acrylate, neopentyl glycol hydroxypivalate di(meth)acrylate, trimethylolpropane tri(meth)acrylate, ethoxylated ditrimethylolpropane tri(meth)acrylate, ditrimethylolpropane tetra(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, dicyclopentanyl di(meth)acrylate, ethoxylated hydrogenated bisphenol A di(meth)acrylate, ethoxylated bisphenol A di(meth)acrylate, ethoxylated bisphenol F di(meth)acrylate, ethoxylated bisphenol S di(meth)acrylate, hydroxypropyl di(meth)acrylate, diethylene glycol bishydroxypropyl(meth)acrylate and monohydroxypentaerythritol tri(meth)acrylate, and any other vinyl monomer such as acrylamide, methacrylamide, vinyl ether, a styrene derivative, vinyl ester, a maleic acid derivative, maleimides, a fumaric acid derivative and itaconic acid.

In consideration of solubility of the resultant photoalignable polymer composition in the solvent, polarity of the non-photoalignable polymer being the second component and the photoalignable polymer being the first component, or the like, the monomers having no photoalignable group preferably include alkyl mono(meth)acrylate such as methyl(meth)acrylate, ethyl(meth)acrylate, butyl(meth)acrylate, 2-ethylhexyl (meth)acrylate; and hydroxyalkyl mono(meth)acrylate such as 2-hydroxyethyl(meth)acrylate, 2-hydroxypropyl(meth)acrylate, 2-hydroxybutyl(meth)acrylate and 3-hydroxypropyl(meth)acrylate.

Moreover, as the monomer having no photoalignable group, a commercially available monofunctional monomer or polyfunctional monomer can also be used. Specific examples include ARONIX M-5400 (monohydroxyethyl acrylate phthalate), ARONIX M-5700 (2-hydroxy-3-phenoxypropylacrylate), ARONIX M-215 (ethylene oxide-modified isocyanurate diacrylate), ARONIX M-220 (tripropylene glycol diacrylate), ARONIX M-245 {polyethylene glycol (n is nearly equal to 9)diacrylate}, ARONIX M-305 (pentaerythritol triacrylate), ARONIX M-309 (trimethylolpropane triacrylate), ARONIX M-315 (ethylene oxide-modified isocyanurate triacrylate), ARONIX M-400 {mixture of dipentaerythritol pentaacrylate and dipentaerythritol hexaacrylate (main component)}, ARONIX M-450 (pentaerythritol tetraacrylate), ARONIX M-8060 and ARONIX M-8560 as made by Toagosei Chemical Industry Co., Ltd.; BISCOAT #295 (trimethylolpropane triacrylate), BISCOAT #300 (pentaerythritol triacrylate), BISCOAT #360 (ethylene oxide-modified trimethylolpropane triacrylate) and BISCOAT #400 (pentaerythritol tetraacrylate) as made by Osaka Organic Chemical Industry Ltd.; KAYARAD TMPTA (trimethylolpropane triacrylate), KAYARAD PET-30 (pentaerythritol triacrylate), KAYARAD DPHA {mixture of dipentaerythritol pentaacrylate and dipentaerythritol hexaacrylate (main component)}, KAYARAD D-310 (dipentaerythritol pentaacrylate), KAYARAD D-330 and KAYARAD DPCA-60 as made by Nippon Kayaku Co., Ltd.

The monomers having no photoalignable group preferably include polyfunctional acrylate including trifunctional or higher functional acrylate, such as trimethylolpropane triacrylate, pentaerythritol triacrylate, pentaerythritol tetraacrylate, dipentaerythritol pentaacrylate, dipentaerythritol hexaacrylate, ARONIX M-305, ARONIX M-309, ARONIX M-400 and ARONIX M-450 as made by Toagosei Chemical Industry Co., Ltd., BISCOAT #295, BISCOAT #300 and BISCOAT #400 as made by Osaka Organic Chemical Industry Ltd., and KAYARAD TMPTA, KAYARAD DPHA, KAYARAD D-310 and KAYARAD PET-30 as made by Nippon Kayaku Co., Ltd.

Any other monomers described above can be used alone in one kind or in combination with two or more kinds. In consideration of a relationship with polarity of the photoalignable polymer being the first component additionally, any other monomer is preferably a mixture of (meth)acrylate including a nonpolar group, such as alkyl mono(meth)acrylate and aryl mono(meth)acrylate, mono(meth)acrylate including a hydroxyl group, such as hydroxyalkyl mono(meth)acrylate, methacrylate and methacrylic acid each including a phenolic hydroxyl group, and a monomer including a carboxyl group, such as mono(methacrylate) including a carboxyl group.

A method for manufacturing the non-photoalignable polymer is not particularly limited in a manner similar to the case of the photoalignable polymer. The non-photoalignable polymer can be manufactured by an ordinary method that is industrially applied. The non-photoalignable polymer can be manufactured by performing cationic polymerization, radical polymerization, anionic polymerization or the like, but the radical polymerization is preferred from a viewpoint of ease of reaction control.

Also as a polymerization initiator for the radical polymerization, various kinds of polymerization initiators such as a thermal radical polymerization initiator and a photoradical polymerization initiator can be used in a manner similar to the case of the photoalignable polymer. Moreover, as the thermal radical polymerization initiator or the photoradical polymerization initiator, the polymerization initiator similar to the initiator for the photoalignable polymer can be used in a similar manner. A form of radical polymerization is also similar to the case of the photoalignable polymer, and a solvent and a chain transfer agent similar to the solvent and the chain transfer agent for the photoalignable polymer can also be used in a manner similar to the photoaligning polymer. Moreover, polymerization conditions upon performing the solution polymerization are also similar to the case of the photoalignable polymer.

Weight average molecular weight of the non-photoalignable polymer is preferably in the range of approximately 1,000 to approximately 500,000, further preferably, in the range of approximately 5,000 to approximately 200,000. The non-photoalignable polymer being the second component may be a homopolymer of one kind or a mixture of polymers of two or more different kinds.

The amount of compounding the first component and the second component is not particularly limited, as long as the advantageous effects of the invention are produced. A mass ratio of the first component to the second component {(first component):(second component)} is ordinarily in the range of approximately 1:99 to approximately 50:50, preferably, in the range of approximately 5:95 to approximately 30:70, further preferably, in the range of approximately 10:90 to approximately 25:75.

The monomer including the photoalignable group, which forms the photoalignable polymer being the first component, for example, a monomer including the group having the cinnamic acid skeleton may occasionally have a relatively high refractive index. Therefore, if the amount of the constitutional unit having the photoalignable group is exceedingly large, when the photoalignment film is prepared on the substrate or the like from the photoalignable polymer composition, an influence may be occasionally exerted on the transmittance, the color difference or the like of the film as a whole. In order to reduce such an influence, the content of the photoalignable group, for example, the content of the group having the cinnamic acid skeleton may be reduced. However, a decrease in the photoalignable group generally causes a decrease in sensitivity of the photoalignment film to light. In the case of the photoalignable polymer composition of the invention, the photoalignable polymer being the first component has the silicone group or the fluorine-substituted alkyl group, and the photoalignable group. Therefore, upon applying the composition with the non-photoalignable polymer being the second component onto the substrate or the like, the photoalignable group can be more easily concentrated on the surface in contact with ambient air. As a result, even when the content of the photoalignable group included in the photoalignable polymer composition is low, a photoalignment film having a high sensitivity to light can be prepared.

The photoalignable polymer composition of the invention is suitably applied onto the substrate, laminated thereon, and used as a liquid crystal alignment film, for example. Therefore, characteristics necessary for an optical film, an optical display device or the like, such as alignment ability, close contact with the substrate, application uniformity, chemical resistance, heat resistance, transmittance and gas barrier properties may be occasionally required. Therefore, various kinds of additives may be contained in the photoalignable polymer composition for the purpose of providing the film or the device with the characteristics or the like.

Specific examples of the additives include a polymer dispersing agent, an applicability improver, a close contact improver, an ultraviolet light absorber, an agglomeration inhibitor, an alkali solubility accelerator, a sensitizer and a crosslinking agent.

Specific examples of the polymer dispersing agent include an acrylic polymer dispersing agent, a styrenic polymer dispersing agent, an ethyleneimine polymer dispersing agent and a urethane polymer dispersing agent. Specific examples of the applicability improver include a silicone resin. Specific examples of the close contact improver include a silane coupling agent. Specific examples of the ultraviolet light absorber include alkoxy benzophenones. Specific examples of the agglomeration inhibitor include sodium polyacrylate. Specific examples of the thermal crosslinking agent include an oxirane compound, a melamine compound and a bisazide compound. Specific examples of the alkali solubility accelerator include organic carboxylic acid.

As the sensitizer, a colorless sensitizer and a triplet sensitizer are preferred. Specific examples of the photosensitizer include an aromatic nitro compound, coumarin (7-diethylamino-4-methylcoumarin, 7-hydroxy-4-methylcoumarin), ketocoumarin and carbonylbiscoumarin), aromatic 2-hydroxyketone, and amino-substituted, aromatic 2-hydroxyketone (2-hydroxybenzophenone, or mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-(3-naphthothiazoline and 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-(α-naphthoylmethylene)-3-methylbenzoxazoline, 2-(4-biphenoylmethylene)-3-methylbenzoxazoline, 2-(β-naphthoylmethylene)-3-methyl-β-naphthoxazoline, 2-(4-biphenoylmethylene)-3-methyl-β-naphthoxazoline and 2-(p-fluorobenzoylmethylene)-3-methyl-β-naphthoxazoline), benzothiazole, nitroaniline (m- or p-nitroaniline and 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene (2-naphthalene methanol, 2-naphthalene carboxylic acid) anthracene (9-anthracene methanol, 9,10-dipropoxyanthracene, 9,10-dibutoxyanthracene and 9-anthracene carboxylic acid), benzopyran, azoindolizine and furocoumarin. Among the photosensitizers, aromatic 2-hydroxyketone (benzophenone), coumarin, ketocoumarin, carbonylbiscoumarin, acetophenone, anthraquinone, xanthone, thioxanthone and acetophenone ketal are preferred.

Specific examples of the crosslinking agent include an oxirane compound, a melamine compound, an epoxy compound, an isocyanate compound, a glycoluril compound and a bisazide compound.

The amount of adding the various kinds of additives is appropriately determined depending on an application, the characteristics or the like, but is preferably in the range of approximately 0.01 to 20% by weight based on the total weight of the first component and the second component. In addition, the amount of adding the sensitizer and the crosslinking agent is ordinarily in the range of approximately 1 to approximately 100% by weight based on the total weight of the first component and the second component.

As the additives, a coupling agent, a surfactant or the like can also be used in addition thereto.

The coupling agent is used in order to improve the close contact with the substrate. Specific examples of the coupling agent include a silane coupling agent such as 3-glycidoxypropyldimethylethoxysilane, 3-glycidoxypropylmethyldiethoxysilane and 3-glycidoxypropyltrimethoxysilane; an aluminum coupling agent such as acetoalkoxyaluminum diisopropylate; and a titanate coupling agent such as tetraisopropylbis(dioctylphosphite)titanate. The amount of adding the coupling agent is ordinarily approximately 10 parts by weight or less based on 100 parts by weight of the components (solid) excluding the solvent contained in the photoalignable polymer composition.

The surfactant is used in order to improve wettability to a base substrate, levelability and applicability. Specific examples of the surfactant include a fluorine surfactant such as MEGAFAC F-555, MEGAFAC F-556, MEGAFAC F-557, MEGAFAC F-558, MEGAFAC F-559 and MEGAFAC F-561 as made by DIC, Inc.; a silicone surfactant such as Byk-300, Byk-306, Byk-335, Byk-310, Byk-341, Byk-344 and Byk-370 as made by BYK-Chemie GmbH; an acrylic surfactant such as Byk-354, Byk-358 and Byk-361 as made by BYK-Chemie GmbH; and a fluorine surfactant such as SC-101 made by Asahi Glass Co., Ltd., and EF-351 and EF-352 as made by Tohchem Products Corporation. The amount of adding the surfactant is ordinarily in the range of approximately 0.01 to approximately 1 part by weight based on 100 parts by weight of the photoalignable polymer composition.

The photoalignable polymer composition of the invention may further contain a solvent in order to apply the composition to the base material, for example, as a photoaligning agent. Specific examples of the solvent include a glycol solvent such as ethylene glycol, diethylene glycol, triethylene glycol and propylene glycol; and a glycol ether solvent such as diethylene glycol monomethyl ether, triethylene glycol monomethyl ether, propylene glycol monomethyl ether, propylene glycol-1-monomethyl ether acetate, 1-methoxy-2-propanol and 3-methoxy-3-methyl-1-butanol, a ketone solvent such as cyclopentanone, cyclohexanone, methyl ethyl ketone and methyl isobutyl ketone, an aromatic hydrocarbon solvent such as toluene, p-cymene and limonene, and a cycloalkane solvent such as cyclohexane. When the glycol ether solvent is used among the solvents, even if the composition is applied as the photoaligning agent or the like to a substrate formed of triacetyl cellulose (TAC), the solvent tends not to corrode the substrate. Furthermore, the ketone solvent such as cyclopentanone, cyclohexanone and methyl isobutyl ketone may be occasionally mixed with the glycol ether solvent such as 1-methoxy-2-propanol in order to improve the close contact with the substrate. The amount to be mixed is in the range of approximately 1 to approximately 50% by weight, preferably, in the range of approximately 5 to approximately 30% by weight, further preferably, in the range of approximately 10 to approximately 25% by weight, based on the glycol ether solvent. Moreover, several kinds of solvents may be occasionally mixed in order to uniformize a film surface during film formation. Specific examples include a mixed solvent of the ketone solvent, the aromatic hydrocarbon solvent and the cycloalkane solvent, and the glycol ether solvent and the aromatic hydrocarbon solvent. The solvent to be used may occasionally influence solubility of a photoalignment film polymer, the close contact with the substrate, film surface uniformity during film formation, and sensitivity of alignment of polymerizable liquid crystals during preparation of a phase difference film. Use of a solvent to satisfy the characteristics is required.

The amount of adding the solvent is ordinarily in the range of approximately 70 to approximately 99 parts by weight based 100 parts by weight of a total of the first component and the second component.

The photoalignment film can be obtained by applying the photoalignable polymer composition containing the solvent onto the base material or the like, removing the solvent to obtain a laminated film, and then irradiating the film with light such as polarized light. Application to the base material or the like can be performed according to a publicly known method such as a spin coating method, a gravure coater method, a reverse gravure method, a Mayer bar coater method, a die coater method, a reverse roll coater method, a fountain reverse roll coater method, a kiss roll coater method, a bar coater method, a knife coater method, a lip coater method and a resist coater method.

After the laminated film is obtained by removing the solvent after the application, the film is irradiated with light such as polarized light. Irradiation with light is preferably performed from a single direction to the film. Molecules in the photoalignable group included in the photoalignable polymer contained in the film are aligned by the irradiation with light, and a photoalignment function and optical anisotropy are developed. Therefore, the photoalignment film can be suitably used as the liquid crystal alignment film.

Specific examples of light used for the irradiation include X-rays, an electron beam, ultraviolet light, visible light and infrared light (heat rays). Among the types of light, ultraviolet light is preferred. Wavelength of ultraviolet light is preferably approximately 400 nanometers or less, further preferably, in the range of approximately 180 to approximately 360 nanometers. As a light source, a low-pressure mercury lamp, a high-pressure mercury lamp, an ultra-high-pressure mercury lamp, a high-pressure discharge lamp, a short arc discharge lamp or the like is preferred.

As long as an alignment function can be provided, irradiation with light may be performed using unpolarized light, but preferably is performed using linearly polarized light. Irradiance is preferably in the range of approximately 5 mJ/cm$^2$ to approximately 2,000 mJ/cm$^2$, further preferably, in the range of approximately 10 mJ/cm$^2$ to approximately 1,000 mJ/cm$^2$.

The thus obtained photoalignment film can be suitably used, for example as the liquid crystal alignment film.

The optical film can be obtained using the liquid crystal alignment film of the invention. The optical film is suitable for an optical compensation film, a phase difference plate such as a patterned phase difference plate, or the like for realizing an improvement in contrast or extension of a viewing angle range of a liquid crystal display device.

The optical film generally has the base material, the liquid crystal alignment film and an optically anisotropic layer. The optically anisotropic layer can be obtained by applying onto the liquid crystal alignment film formed on the base material a polymerizable liquid crystal composition containing a polymerizable liquid crystal compound, and also various components to be added as required, aligning molecules of the liquid crystal compound, and then polymerizing the compound. The optically anisotropic layer shows the optical anisotropy developed by alignment of the molecules of the liquid crystal compound. Therefore, the optical film can be suitably used, for example, as the patterned phase difference plate. Such an optical film can be suitably used for various kinds of optical devices, for example, the liquid crystal display device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereinafter, the invention will be explained more specifically by way of Examples, but the invention is not limited by the Examples. A structure of a compound was confirmed by a nuclear magnetic resonance spectrum. Moreover, phase transition temperature was also measured. A unit of the phase transition temperature is degree Centigrade (° C.), and a symbol C stands for crystals, a symbol N stands for a nematic phase, a symbol SA stands for a smectic A phase, a symbol SB stands for a smectic B phase, and a symbol I stands for an isotropic liquid phase. In the following, methods for measuring physical properties will be shown.

Preparation of Substrate with Photoalignment Film

A photoalignable polymer composition (photoaligning agent) was applied onto a glass substrate using a spin coater, and then the substrate was heated at 80° C. for 1 minute to remove a solvent, and thus a coating film was formed. A substrate with a photoalignment film was prepared by irradiating a surface of the coating film with linearly polarized ultraviolet light having a wavelength in the vicinity of 313 nanometers from a direction at 90 degrees relative to an applied surface by means of an ultra-high-pressure mercury lamp.

Preparation of Optical Phase Difference Plate

A solution containing a polymerizable liquid crystal composition was applied onto a substrate with a photoalignment film, and then the substrate was heated at 60° C. for 1 minute, and a solvent was removed. Then, a coating film of polymerizable liquid crystals was formed by cooling the substrate at room temperature for 1 minute. An optical phase difference plate was prepared by irradiating the substrate with light having an intensity of 90 mW/cm$^2$ (365 nm) using a 500 W ultra-high-pressure mercury lamp at room temperature for 30 seconds under a nitrogen atmosphere or in atmospheric air.

Confirmation of Alignment of Liquid Crystal Molecules

A substrate with a photoalignment film, wherein polymerizable liquid crystals were applied onto the substrate, was inserted between two polarizing plates arranged in a crossed nicol configuration, and observed, the substrate was rotated in a horizontal plane, and then a state of contrast and presence or absence of an alignment defect were confirmed.

Confirmation of Light Transmittance

Transmittance of a substrate with a photoalignment film was measured by irradiating the substrate with light having a wavelength of 430 nanometers by means of JASCO V-650 Spectrophotometer made by Jasco Corporation.

Confirmation of Color Difference

Transmittance at each wavelength was measured by irradiating the substrate with light having a wavelength in the range of 380 to 780 nanometers by means of JASCO V-650 Spectrophotometer made by Jasco Corporation. Then, b* according to a L*a*b* colorimetric system was calculated by spectrum analysis using color calculation program software (JASCO V-600 for Windows) in accordance with a calculating equation described in JIS Z8729-2004. Herein, b* is an index of yellowness or blueness to show that the color is more achromatic as b* is closer to 0 (zero).

Measurement of Weight Average Molecular Weight (Mw)

Shimadzu LC-9A Gel Permeation Chromatograph (GPC) made by Shimadzu Corporation and a column Shodex GF-7MHQ (eluent: DMF or THF, and a standard reference material: polystyrene having known molecular weight) made by Showa Denko were used.

Measurement of Film Thickness

An anisotropic polymer layer on a substrate with an anisotropic polymer was shaved off, and a profile thereof was measured by means of a surface texture measuring apparatus (Alpha-Step IQ made by KLA-Tencor Corporation).

Confirmation of Solubility

A photoaligning agent having a concentration of 20% by weight was diluted with cyclopentanone and 1-methoxy-2-propanol until a concentration of the aligning agent became 5% by weight, and solubility of a photoalignable polymer composition was confirmed. When the solution was clouded or had a remaining solid at room temperature, the composition was evaluated to be undissolved.

Synthesis Example 1

Monomer (1-1) having a photoalignable group (as included in monomer I-1-1-a described above) was prepared as described below.

Formula 45

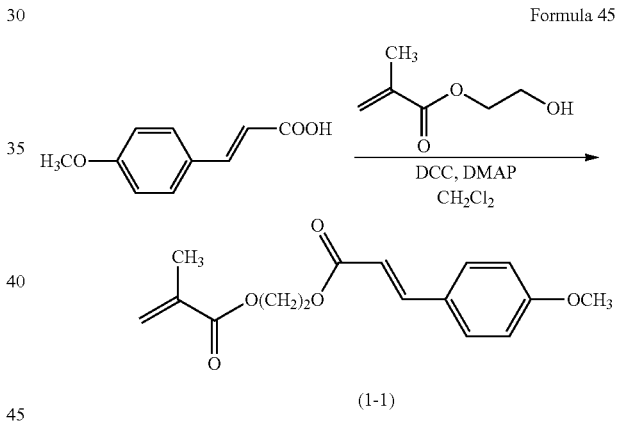

Then, 22.8 g of methoxycinnamic acid, 16.7 g of 2-hydroxybutyl methacrylate and 3.2 g of 4-dimethylaminopyridine (DMAP) were added to 230 mL of dichloromethane, and the resultant mixture was agitated under a nitrogen atmosphere. Thereto, 60 mL of dichloromethane solution containing 27.7 g of 1,3-dicyclohexylcarbodiimide (DCC) was added dropwise. After dropwise addition, the resultant mixture was agitated at room temperature for 8 hours. A precipitate formed was filtered off, and an organic layer was washed with water and dried over anhydrous magnesium sulfate. A solvent was distilled off under reduced pressure, a residue was purified by means of column chromatography, and recrystallized in ethanol, and thus 30.0 g of monomer (1-1) having the photoalignable group was obtained. Measurement results of phase transition temperature and nuclear magnetic resonance spectrum of monomer (1-1) obtained were as described below.

Phase transition temperature: C 37 I.

$^1$H-NMR (CDCl$_3$; δ ppm): 7.67 (d, 1H), 7.49 (d, 2H), 6.91 (d, 2H), 6.33 (d, 1H), 6.16 (s, 1H), 5.60 (s, 1H), 4.48-4.40 (m, 4H), 3.84 (s, 3H), 1.96 (s, 3H).

Synthesis Example 2

Monomer (1-2) having a photoalignable group (as included in monomer I-2-1-a described above) was prepared as described below.

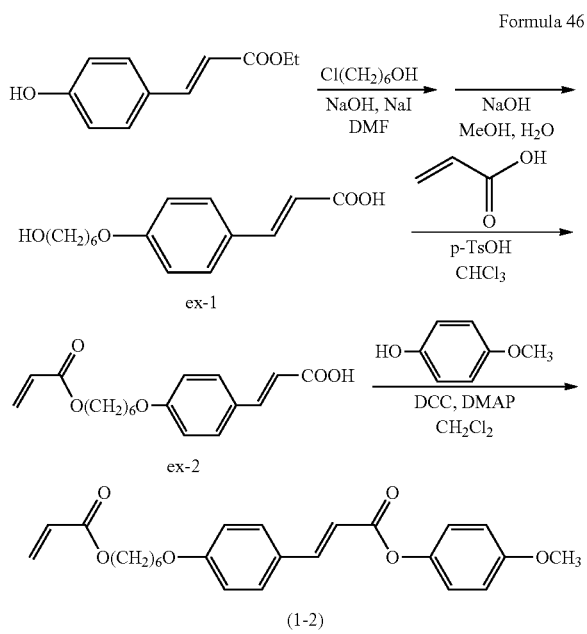

Formula 46

(1-2)

(First Step)

Then, 1,120 mmol of ethyl 4-hydroxycinnamate, 1,230 mmol of sodium hydroxide and 120 mmol of sodium iodide were added to 1,000 mL of N,N-dimethylformamide (DMF), and the resultant mixture was agitated at 60° C. under a nitrogen atmosphere. Thereto, 1,230 mmol of 6-chlorohexanol was added dropwise. After dropwise addition, the resultant mixture was agitated at 80° C. for 8 hours. Ethyl acetate and water were added to a reaction mixture, and an organic layer was extracted. The resultant organic layer was washed with water and dried over anhydrous magnesium sulfate. A solvent was distilled off under reduced pressure. The resultant residue and 1,230 mmol of sodium hydroxide were added to a mixed solution of 800 mL of water and 800 mL of methanol, and the resultant mixture was agitated for 3 hours under heating reflux. A solvent was distilled off under reduced pressure, and the resultant residue was poured into 3 N hydrochloric acid to be reprecipitated. Crystals were filtered off and recrystallized in methanol, and thus 840 mmol of compound (ex-1) was obtained.

(Second Step)

Then, 110 mmol of compound (ex-1), 1,100 mmol of acrylic acid and 240 mmol of p-toluenesulfonic acid (p-TsOH) were added to 600 mL of chloroform, and the resultant mixture was agitated for 8 hours while water was removed under heating reflux using a Dean-Stark apparatus. Water was added to a reaction mixture, and an organic layer was extracted and dried over anhydrous magnesium sulfate. A solvent was distilled off under reduced pressure. The resultant residue was recrystallized in a mixed solvent of chloroform and methanol, and thus 34 mmol of compound (ex-2) was obtained.

(Third Step)

Then, 16 mmol of compound (ex-2), 16 mmol of 4-methoxyphenol and 3 mmol of 4-dimethylaminopyridine (DMAP) were added to 50 mL of dichloromethane, and the resultant mixture was agitated under a nitrogen atmosphere. Thereto, 10 mL of dichloromethane solution containing 17 mmol of 1,3-dicyclohexylcarbodiimide (DCC) was added dropwise. After dropwise addition, the resultant mixture was agitated at room temperature for 8 hours. A precipitate formed was filtered off, and an organic layer was washed with water and dried over anhydrous magnesium sulfate. A solvent was distilled off under reduced pressure, the resultant residue was purified by means of column chromatography, and recrystallized in ethanol, and thus 12 mmol of monomer (1-2) having the photoalignable group was obtained. Measurement results of phase transition temperature and nuclear magnetic resonance spectrum of monomer (1-2) obtained were as described below.

Phase transition temperature: C 64 (SB 34 SA 63) N 93 I.
$^1$H-NMR (CDCl$_3$; δ ppm): 7.81 (d, 1H), 7.52 (d, 2H), 7.07 (m, 2H), 6.92 (m, 4H), 6.47 (d, 1H), 6.40 (dd, 1H), 6.12 (m, 1H), 5.82 (dd, 1H), 4.17 (t, 2H), 4.00 (t, 2H), 3.81 (s, 3H), 1.79 (m, 2H), 1.70 (m, 2H), 1.54-1.44 (m, 4H).

Synthesis Example 3

Monomer (1-3) having a photoalignable group (as included in monomer I-3-1-a described above) was prepared as described below.

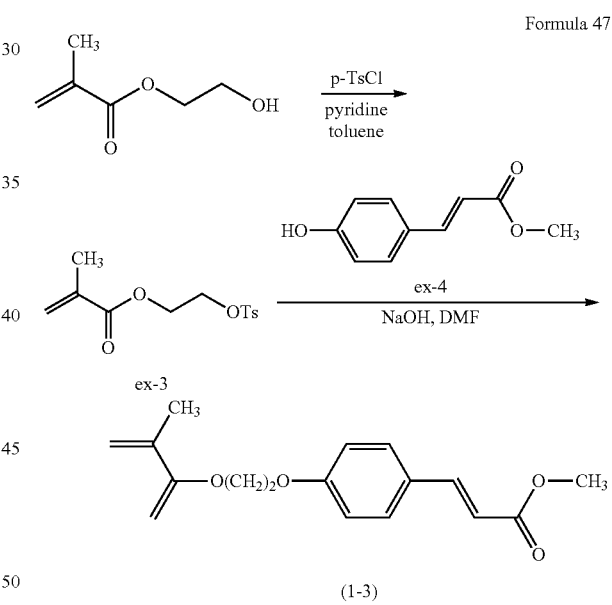

Formula 47

(1-3)

(First Step)

Then, 50 g of 2-hydroxybutyl methacrylate and 50 mL of pyridine were added to 150 mL of toluene, 80 g of p-toluenesulfonic acid chloride was added under cooling, and the resultant mixture was agitated at room temperature for 16 hours under a nitrogen atmosphere. A precipitated salt was removed by filtration under reduce pressure. Water (100 mL) was added to a filtrate, and the resultant mixture was agitated at 40° C. for 2 hours. An organic layer was separated, and the resultant organic layer was sequentially washed with 2 N hydrochloric acid, a saturated aqueous solution of sodium hydrogencarbonate, and water, and dried over anhydrous magnesium sulfate. Toluene was distilled off under reduced pressure, and thus 98 g of crude colorless liquid (ex-3) was obtained.

(Final Step)

Then, 30 g of compound (ex-4) and 7.4 g of sodium hydroxide were added to 150 mL of N,N-dimethylformamide (DMF), and the resultant mixture was agitated at 50° C. under a nitrogen atmosphere. Thereto, 48 g of compound (ex-3) was added dropwise. After dropwise addition, the resultant mixture was agitated at 80° C. for 8 hours. After the resultant mixture was cooled to room temperature, 200 mL of ethyl acetate and water (150 mL) were added, and an organic layer was separated. A precipitate formed was filtered off, and the resultant organic layer was washed with water and dried over anhydrous magnesium sulfate. The resultant organic layer was sequentially washed with 2 N hydrochloric acid, a saturated aqueous solution of sodium hydrogencarbonate, and water, and dried over anhydrous magnesium sulfate. Ethyl acetate was distilled off under reduced pressure, the resultant residue was purified by means of column chromatography (silica gel, eluate:toluene-ethyl acetate mixture (volume ratio: toluene/ethyl acetate=8/1)), and recrystallized in methanol, and thus 27 g of compound (1-3) was obtained.

Measurement results of phase transition temperature and nuclear magnetic resonance spectrum of compound (1-3) obtained were as described below.

Phase transition temperature: C 83 I.

$^1$H-NMR (CDCl$_3$; δ ppm): 7.65 (d, 1H), 7.48 (d, 2H), 6.92 (m, 2H), 6.32 (d, 1H), 6.14 (d, 1H), 5.60 (s, 1H), 4.51 (t, 2H), 4.25 (t, 2H), 3.80 (s, 3H), 1.95 (s, 3H).

Synthesis Example 4

Monomer (1-3-1) having a photoalignable group (as included in monomer I-3-1-j described above) was prepared as described below.

Formula 48

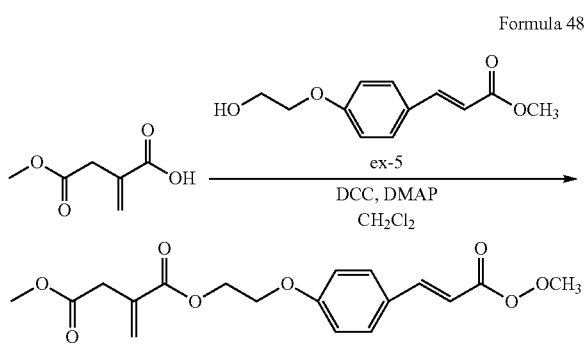

(First Step)

Then, 28 g of monomethyl itaconate, 44 g of compound (ex-5) and 1.2 g of 4-dimethylaminopyridine (DMAP) were added to 200 mL of dichloromethane, and the resultant mixture was agitated while cooling under a nitrogen atmosphere. Thereto, 50 mL of dichloromethane solution containing 22 g of 1,3-dicyclohexylcarbodiimide (DCC) was added dropwise. After dropwise addition, the resultant mixture was agitated at room temperature for 16 hours. A precipitate formed was filtered off, an organic layer was washed with water, and dried over anhydrous magnesium sulfate. Dichloromethane was distilled off under reduced pressure, the resultant residue was purified by means of column chromatography (silica gel, eluate:toluene-ethyl acetate mixture (volume ratio: toluene/ethyl acetate=8/1)), and recrystallized in methanol, and thus 28 g of compound (1-3-1) was obtained.

Measurement results of phase transition temperature and a nuclear magnetic resonance spectrum of compound (1-3-1) obtained were as described below.

Phase transition temperature: C 47 I.

$^1$H-NMR (CDCl$_3$; δ ppm): 7.65 (d, 1H), 7.48 (d, 2H), 6.92 (m, 2H), 6.32 (d, 1H), 6.14 (d, 1H), 5.60 (s, 1H), 4.51 (t, 2H), 4.25 (t, 2H), 3.80 (5, 3H), 3.70 (s, 3H), 3.42 (s, 2H).

Preparation Example 1

Then, 2.07 g of monomer (1-3) having the photoalignable group obtained in Synthesis Example 3, 0.93 g of 2-hydroxyethyl methacrylate, 0.03 g of a monomer having a silicone group (Silaplane FM-0711 (registered trademark) (made by JNC Corporation), represented by formula (I-4-1-a) described above, wherein r is 3, R$^{11}$ is a butyl group, and weight average molecular weight is approximately 1,000), and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of photoalignable polymer (A-1) was obtained. Mw of the photoalignable polymer (A-1) obtained was 58,000.

Preparation Example 2

Then, 2.4 g of methyl methacrylate, 0.6 g of 2-hydroxyethyl methacrylate and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of a non-photoalignable polymer (B-1) was obtained. Mw of the non-photoalignable polymer (B-1) obtained was 47,000.

Preparation Example 3

Then, 1.95 g of monomer (1-3) having the photoalignable group obtained in Synthesis Example 3, 0.90 g of 2-hydroxyethyl methacrylate, 0.15 g of 1H,1H,2H,2H-heptadecafluorodecyl methacrylate and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of photoalignable polymer (C-1) was obtained. Mw of the photoalignable polymer (C-1) obtained was 65,000.

Preparation Example 4

Then, 2.1 g of methyl methacrylate, 0.9 g of methacrylic acid and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of a non-photoalignable polymer (D-1) was obtained. Mw of the non-photoalignable polymer (D-1) obtained was 47,000.

Preparation Example 5

Then, 0.4 g of methyl methacrylate, 0.2 g of methacrylic acid, 0.4 g of 2-hydroxyethyl methacrylate and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of a non-photoalignable polymer (E-1) was obtained. Mw of the non-photoalignable polymer (E-1) obtained was 58,000.

Preparation Example 6

Then, 2.07 g of monomer (1-3-1) having the photoalignable group obtained in Synthesis Example 4, 0.93 g of 2-hydroxyethyl methacrylate, 0.03 g of a monomer having a silicone group (Silaplane FM-0711 (registered trademark) (made by JNC Corporation), represented by formula (I-4-1-a), wherein r is 3, $R^{11}$ is a butyl group, and weight average molecular weight is approximately 1,000), and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of photoalignable polymer (M-1) was obtained. Mw of the photoalignable polymer (M-1) obtained was 47,000.

Example 1

Then, 0.25 g of solution of photoalignable polymer (A-1) obtained in Preparation Example 1 and 2.25 g of solution of non-photoalignable polymer (E-1) obtained in Preparation Example 5 were mixed to 7.5 g of 1-methoxy-2-propanol to form a homogeneous solution, and thus 10 g of aligning agent (F-1) containing a photoalignable polymer composition was obtained. The photoaligning agent (F-1) was applied onto a glass substrate by spin coating. The substrate was heated at 80° C. for 1 minute to remove a solvent, and thus a coating film was formed. A photoalignment film (liquid crystal alignment film) (F-2) having a film thickness of approximately 0.2 micrometer as subjected to photoalignment treatment was obtained by irradiating a surface of the coating film with, at 15 mJ/cm$^2$, linearly polarized ultraviolet light having a wavelength of approximately 313 nanometers from a direction at 90 degrees relative to an applied surface by means of an ultra-high-pressure mercury lamp. Evaluation results are shown in Table 1 below.

Example 2

Then, 0.5 g of solution of photoalignable polymer (C-1) obtained in Preparation Example 3 and 2.0 g of solution of non-photoalignable polymer (B-1) obtained in Preparation Example 2 were mixed to 7.5 g of 1-methoxy-2-propanol to form a homogeneous solution, and thus 10 g of aligning agent (G-1) containing a photoalignable polymer composition was obtained. The photoaligning agent (G-1) was applied onto a glass substrate by spin coating. The substrate was heated at 80° C. for 1 minute to remove a solvent, and thus a coating film was formed. A photoalignment film (liquid crystal alignment film) (G-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. Evaluation results are shown in Table 1 below.

Example 3

Then, 0.5 g of solution of photoalignable polymer (C-1) obtained in Preparation Example 3 and 2.0 g of solution of non-photoalignable polymer (D-1) obtained in Preparation Example 4 were mixed to 7.5 g of 1-methoxy-2-propanol to form a homogeneous solution, and thus 10 g of aligning agent (H-1) containing a photoalignable polymer composition was obtained. The photoaligning agent (H-1) was applied onto a glass substrate by spin coating. The substrate was heated at 80° C. for 1 minute to remove a solvent, and thus a coating film was formed. A photoalignment film (liquid crystal alignment film) (H-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. Evaluation results are shown in Table 1 below.

Example 4

Then, 0.5 g of solution of photoalignable polymer (M-1) obtained in Preparation Example 6 and 3.0 g of solution of non-photoalignable polymer (B-1) obtained in Preparation Example 1 were mixed to 7.5 g of 1-methoxy-2-propanol to form a homogeneous solution, and thus 10 g of aligning agent (N-1) containing a photoalignable polymer composition was obtained. The photoaligning agent (N-1) was applied onto a glass substrate by spin coating. The substrate was heated at 80° C. for 1 minute to remove a solvent, and thus a coating film was formed. A photoalignment film (liquid crystal alignment film) (N-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. Evaluation results are shown in Table 1 below.

Preparation Example 7

Then, 2.4 g of monomer (I-3) having the photoalignable group obtained in Synthesis Example 3, 0.6 g of 2-hydroxyethyl methacrylate and 0.03 g of azobisisobutyronitrile (AIBN) were added to 12 g of 1-methoxy-2-propanol, and the resultant mixture was agitated for 10 hours under heating reflux under a nitrogen atmosphere, and polymerization was performed. As a result, 15 g of solution of photoalignable polymer (I-1) was obtained. Mw of the photoalignable polymer (I-1) obtained was 68,000.

Preparation Example 8

Then, 2.1 g of benzyl methacrylate, 0.9 g of methyl methacrylate and 0.03 g of azobisisobutyronitrile (AIBN) were added to 12 g of cyclopentanone, and the resultant mixture was agitated for 10 hours under heating reflux under a nitrogen atmosphere, and polymerization was performed. As a result, 15 g of solution of non-photoalignable polymer (J-1) was obtained. Mw of the non-photoalignable polymer (J-1) obtained was 50,000.

Comparative Example 1

Then, 1.0 g of solution of only photoalignable polymer (I-1) obtained in Preparation Example 7 was mixed to 3.0 g of 1-methoxy-2-propanol to form a homogeneous solution, and thus 4 g of aligning agent (K-1) containing a photoalignable polymer was obtained. The photoaligning agent (K-1) was applied onto a glass substrate by spin coating. The substrate was heated at 80° C. for 1 minute to remove a solvent, and thus a coating film was formed. A photoalignment film (liquid crystal alignment film) (K-2) having a film thickness of approximately 0.2 micrometer as subjected to photoalignment treatment was obtained by irradiating a surface of the coating film with, at 20 mJ/cm$^2$, linearly polarized ultraviolet light having a wavelength of approximately 313 nanometers from a direction at 90 degrees relative to an applied surface by means of an ultra-high-pressure mercury lamp. Evaluation results are shown in Table 1 below.

Comparative Example 2

Then, 0.5 g of solution of photoalignable polymer (I-1) obtained in Preparation Example 7 and 2.0 g of solution of non-photoalignable polymer (J-1) obtained in Preparation Example 8 were mixed to 7.5 g of 1-methoxy-2-propanol to form a homogeneous solution, and thus 10 g of aligning agent (L-1) containing a photoalignable polymer composition was obtained. The photoaligning agent (L-1) was applied onto a glass substrate by spin coating. The substrate was heated at 80° C. for 1 minute to remove a solvent, and thus a coating film was formed. Then, linearly polarized ultraviolet light having a wavelength of approximately 313 nanometers was irradiated, at 100 mJ/cm², on a surface of the coating film from a direction at 90 degrees relative to an applied surface by means of an ultra-high-pressure mercury lamp. However, no photoalignment film (liquid crystal alignment film) was obtained. Evaluation results are shown in Table 1 below.

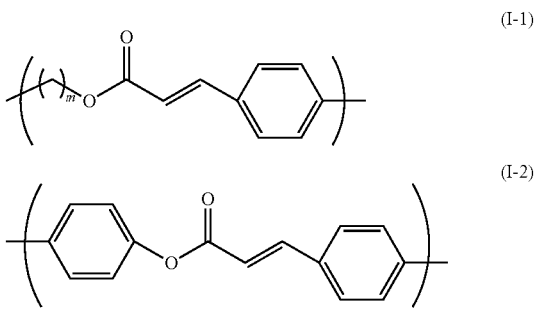

TABLE 1

| | Polymer (1) | Polymer (2) | Weight ratio of polymer (1)/(2) | Sensitivity (mJ/cm²) | Photoalignable polymer composition Color difference b* | Transmittance (%) | Solubility 1-Methoxy-2-propanol | Cyclo-pentanone |
|---|---|---|---|---|---|---|---|---|
| Example 1 | A-1 | E-1 | 1/9 | 15 | −0.03 | 100 | Good | Good |
| Example 2 | C-1 | B-1 | 1/4 | 20 | −0.01 | 100 | Good | Good |
| Example 3 | C-1 | D-1 | 1/4 | 20 | −0.05 | 100 | Good | Good |
| Example 4 | M-1 | B-1 | 1/6 | 20 | 0.02 | 99 | Good | Good |
| Comparative Example 1 | I-1 | — | — | 20 | 0.68 | 98 | Good | Good |
| Comparative Example 2 | I-1 | J-1 | 1/9 | No alignment | — | — | Bad | Good |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A photoalignable polymer composition of the invention contains the first component being a photoalignable polymer and the second component being a non-photoalignable polymer. Therefore, a photoalignable film obtained by applying a photoaligning agent containing the composition to a base material or the like and drying an applied surface thereon is excellent in sensitivity to allow photoalignment even with exposure in a short period of time. Thus, the composition is suitable for a photoalignment method. Moreover, a liquid crystal alignment film obtained using the photoalignable polymer composition of the invention requires no rubbing treatment, and therefore has no alignment defect and allows a uniform alignment of liquid crystal molecules. Therefore, the liquid crystal alignment film is suitable for use in the form of an optical film or an optical device such as a liquid crystal display device.

The invention claimed is:

1. A photoalignable polymer composition, containing as a first component a polymer having a silicone group and a photoalignable group, and as a second component a non-photoalignable polymer obtained by polymerizing a monomer containing at least one selected from the group of methacrylic acid and methacrylate,
wherein the photoalignable group in the first component has at least one structure represented by formulas (I-1) and (I-2) as described below, -continued

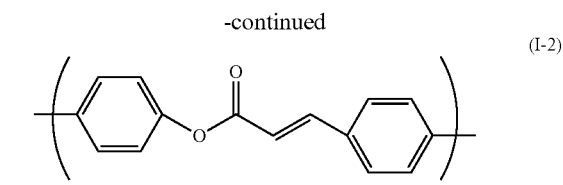

wherein m represents an integer from 0 to 6, and arbitrary hydrogen of a phenylene group may be replaced by fluorine, a methyl group or a methoxy group, and wherein the polymer of the first component has a silicone group and the silicone group is represented by formula (I-4) as described below,

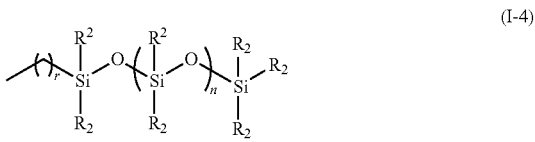

wherein $R^2$ represents hydrogen or an alkyl group having 1 to 5 carbons in which arbitrary hydrogen may be replaced by fluorine, r represents an integer from 0 to 6 and n represents an integer from 1 to 200.

2. The photoalignable polymer composition according to claim 1, wherein the non-photoalignable polymer of the second component is obtained by polymerizing a monomer containing at least one selected from the group of methacrylic acid, alkyl methacrylate, hydroxyalkyl methacrylate including a hydroxyalkyl group having 2 to 5 carbons, methacrylate including a carboxyl group and methacrylate including a phenolic hydroxyl group.

3. The photoalignable polymer composition according to claim 1, wherein the polymer of the first component includes a constitutional unit represented by formulas (I-1-1') and (I-4-1) as described below,

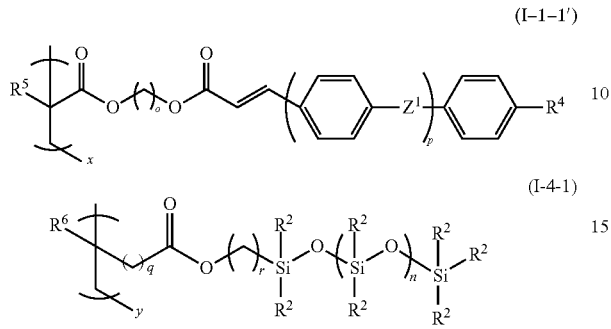

wherein $R^2$ represents hydrogen or an alkyl group having 1 to 5 carbons in which arbitrary hydrogen may be replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^5$ represents hydrogen or a methyl group, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: $x+y \leq 1$, and arbitrary hydrogen of a phenylene group may be replaced by fluorine, a methyl group or a methoxy group,

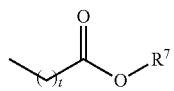

wherein $R^7$ represents hydrogen or a methyl group, and t represents 0 or 1.

4. The photoalignable polymer composition according to claim 1, wherein the polymer of the first component includes a constitutional unit represented by formula (I-2-1') and formula (I-4-1) as described below, wherein $R^2$ represents hydrogen or an alkyl group having 1 to 5 carbons in which arbitrary hydrogen may be replaced by fluorine, $R^4$ represents hydrogen, an alkyl group having 1 to 20 carbons in which arbitrary hydrogen may be replaced by fluorine, or an alkoxy group having 1 to 20 carbons in which arbitrary hydrogen may be replaced by fluorine, $R^5$ represents hydrogen or a methyl group, $R^6$ represents hydrogen, a methyl group or a group represented by formula (II) as described below, $Z^1$ represents a single bond, —COO— or —OCO—, r represents an integer from 0 to 6, n represents an integer from 1 to 200, o represents an integer from 2 to 6, p represents an integer from 0 to 2, q represents 0 or 1, x and y are a molar fraction, and satisfy a relationship: $x+y \leq 1$, and arbitrary hydrogen of a phenylene group may be replaced by fluorine, a methyl group or a methoxy group,

wherein $R^7$ represents hydrogen or a methyl group, and t represents 0 or 1.

5. The photoalignable polymer composition according to claim 1, wherein the polymer of the first component has a silicone group and a weight average molecular weight of the silicone group is 50,000 or less.

6. The photoalignable polymer composition according to claim 1, wherein the polymer of the first component has a silicone group, and the polymer is obtained by polymerizing a monomer mixture containing a monomer having the silicone group in the range of 0.01 to 50% by weight based on the total monomers.

7. The photoalignable polymer composition according to claim 1, wherein a mass ratio of the first component to the second component {(first component):(second component)} is 1:99 to 50:50.

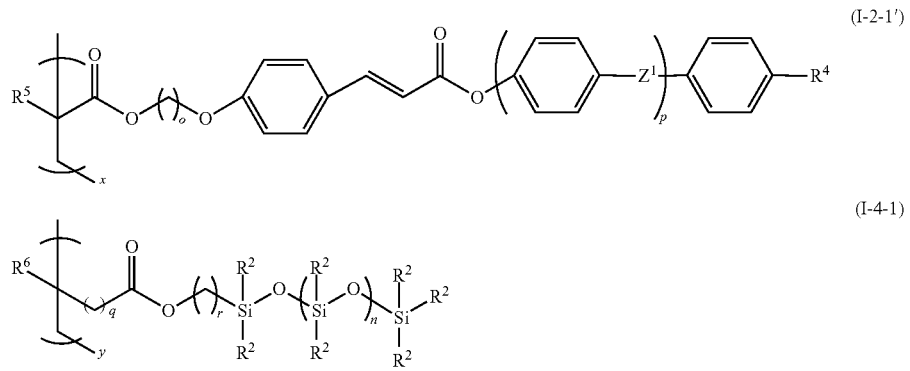

8. The photoalignable polymer composition according to claim 1, further containing a glycol solvent or a glycol ether solvent that can dissolve the first component and the second component.

9. An optical device, comprising a phase difference plate obtained with the photoalignable polymer composition according to claim 1.

* * * * *